(12) United States Patent
Rahman et al.

(10) Patent No.: US 11,277,247 B2
(45) Date of Patent: Mar. 15, 2022

(54) METHOD AND APPARATUS TO ENABLE CSI REPORTING IN WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 16/829,716

(22) Filed: Mar. 25, 2020

(65) Prior Publication Data

US 2020/0328862 A1 Oct. 15, 2020

Related U.S. Application Data

(60) Provisional application No. 62/832,053, filed on Apr. 10, 2019, provisional application No. 62/834,597, (Continued)

(51) Int. Cl.
*H04L 5/00* (2006.01)
*H04B 7/0456* (2017.01)
*H04L 27/26* (2006.01)

(52) U.S. Cl.
CPC ........ *H04L 5/0053* (2013.01); *H04L 27/2608* (2013.01)

(58) Field of Classification Search
CPC ............................. H04L 5/0053; H04B 7/0486
See application file for complete search history.

(56) References Cited

U.S. PATENT DOCUMENTS

2008/0076386 A1* 3/2008 Khetawat .............. H04W 12/08
455/410
2008/0076425 A1* 3/2008 Khetawat .............. H04W 88/12
455/436

(Continued)

OTHER PUBLICATIONS

"LTE; Evolved Universal Terrestrial Radio Access (E-UTRA); Physical channels and modulation (3GPP TS 36.211 version 15.4.0 Release 15)", ETSI TS 136 211 V15.4.0, May 2019, 242 pages.

(Continued)

*Primary Examiner* — Faruk Hamza
*Assistant Examiner* — Abusayeed M Haque

(57) ABSTRACT

A method for operating a user equipment (UE) comprises, in response to a condition being satisfied, selecting, from a full basis set, a basis subset comprising $M_l$ bases for each layer l of a plurality of v layers; in response to the condition not being satisfied, selecting, from the full basis set, an intermediate basis set comprising N' bases that are common among the plurality of v layers, and selecting, from the selected intermediate basis set, the basis subset comprising $M_l$ bases for each layer l of the plurality of v layers; transmitting, to a base station (BS), for each layer l of the plurality of v layers, an indicator $i_{1,6,l}$ indicating indices of the $M_l$ bases included in the selected basis subset; and based on the condition not being satisfied, transmitting, to the BS, an indicator $i_{1,5}$ indicating indices of the N' bases included in the selected intermediate basis set.

20 Claims, 14 Drawing Sheets

Related U.S. Application Data filed on Apr. 16, 2019, provisional application No. 62/840,556, filed on Apr. 30, 2019, provisional application No. 62/845,514, filed on May 9, 2019, provisional application No. 62/846,956, filed on May 13, 2019, provisional application No. 62/928,690, filed on Oct. 31, 2019.

(56) References Cited

U.S. PATENT DOCUMENTS

| | | | |
|---|---|---|---|
| 2015/0245046 A1* | 8/2015 | Tsukuba | H04N 19/46 375/240.25 |
| 2016/0191931 A1* | 6/2016 | Hannuksela | H04N 19/136 375/240.12 |
| 2016/0212437 A1* | 7/2016 | Tsukuba | H04N 19/44 |
| 2018/0145737 A1 | 5/2018 | Rahman et al. | |
| 2020/0007205 A1* | 1/2020 | Park | H04B 7/06 |
| 2020/0044702 A1* | 2/2020 | Kakishima | H04B 7/0626 |

OTHER PUBLICATIONS

"LTE; Evolved Universal Terrestrial Radio Access (E-UTRA); Multiplexing and channel coding (3GPP TS 36.212 version 15.4.0 Release 15)", ETSI TS 136 212 V15.4.0, Apr. 2019, 249 pages.
"LTE; Evolved Universal Terrestrial Radio Access (E-UTRA); Physical layer procedures (3GPP TS 36.213 version 15.4.0 Release 15)", ETSI TS 136 213 V15.4.0, May 2019, 551 pages.
"LTE; Evolved Universal Terrestrial Radio Access (E-UTRA); Medium Access Control (MAC) protocol specification (3GPP TS 36.321 version 15.4.0 Release 15)", ETSI TS 136 321 V15.4.0, Apr. 2019, 133 pages.
"LTE; Evolved Universal Terrestrial Radio Access (E-UTRA); Radio Resource Control (RRC); Protocol specification (3GPP TS 36.331 version 15 4.0 Release 15)", ETSI TS 136 331 V15.40, Apr. 2019, 929 pages.
"3rd Generation Partnership Project;Technical Specification Group Services and System Aspects; Feasibility Study on New Services and Markets Technology Enablers; Stage 1 (Release 14)", 3GPP TR 22.891 V14.2.0, Sep. 2016, 95 pages.
"3rd Generation Partnership Project; Technical Specification Group Radio Access Network; NR; Multiplexing and channel coding (Release 15)", 3GPP TS 38.212 V15.40, Dec. 2018, 100 pages.
"3rd Generation Partnership Project; Technical Specification Group Radio Access Network; NR; Physical layer procedures for data (Release 15)", 3GPP TS 38.214 V15.4.0, Dec. 2018, 102 pages.
Samsung, "Feature lead summary for MU-MIMO CSI", 3GPP TSG RAN WG1 96bis, Apr. 12-16, 2019, R1-1904448, 17 pages.
Spreadtrum Communications, "Discussion on Type 11 CSI overhead reduction", 3GPP TSG RAN WG1 Meeting #96bis, R1-1904780, 5 pages.
Ericsson, "On CSI enhancements for MU-MIMO", 3GPP TSG RAN WG1 Meeting RAN1#96-bis, Apr. 8-12, 2019, R1-1905519, 13 pages.
Motorola Mobility/Lenovo, "MU-MIMO CSI Enhancement", 3GPP TSG RAN1#96bis, Apr. 8-12, 2019, R1-1905681, 16 pages.
International Search Report dated Jul. 30, 2020 in connection with International Patent Application No. PCT/KR2020/004591, 3 pages.
Written Opinion of the International Searching Authority dated Jul. 30, 2020 in connection with International Patent Application No. PCT/KR2020/004591, 5 pages.

* cited by examiner

METHOD AND APPARATUS TO ENABLE CSI REPORTING IN WIRELESS COMMUNICATION SYSTEMS

CROSS-REFERENCE TO RELATED APPLICATION(S) AND CLAIM OF PRIORITY

The present application claims priority to U.S. Provisional Patent Application No. 62/832,053 filed on Apr. 10, 2019, U.S. Provisional Patent Application No. 62/834,597, filed on Apr. 16, 2019, U.S. Provisional Patent Application No. 62/840,556 filed on Apr. 30, 2019, U.S. Provisional Patent Application No. 62/845,514, filed on May 9, 2019, U.S. Provisional Patent Application No. 62/846,956 filed on May 13, 2019, and U.S. Provisional Patent Application No. 62/928,690, filed on Oct. 31, 2019. The content of the above-identified patent documents is incorporated herein by reference.

TECHNICAL FIELD

The present disclosure relates generally to wireless communication systems and more specifically to channel state information (CSI) reporting in wireless communication systems.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable CSI reporting in a wireless communication system.

In one embodiment, a UE is provided. The UE includes a processor configured to: in response to a condition being satisfied, select, from a full basis set, a basis subset comprising $M_l$ bases for each layer l of a plurality of v layers; and in response to the condition not being satisfied, select, from the full basis set, an intermediate basis set (IntS) comprising N' bases that are common among the plurality of v layers, and select, from the selected intermediate basis set, the basis subset comprising $M_l$ bases for each layer l of the plurality of v layers. The UE further includes a transceiver operably connected to the processor. The transceiver is configured to: transmit, to a base station (BS), for each layer l of the plurality of v layers, an indicator $i_{1,6,l}$ indicating indices of the $M_l$ bases included in the selected basis subset; and based on the condition not being satisfied, transmit, to the BS, an indicator $i_{1,5}$ indicating indices of the N' bases included in the selected intermediate basis set (IntS), wherein the full basis set comprises $N_3$ bases, and wherein $N_3$, N', and $M_l$ are positive integers; $M_l<N_3$ when the condition is satisfied and $M_l<N'<N_3$ when the condition is not satisfied; $l \in \{1, \ldots, v\}$; and $v \geq 1$ is a rank value.

In another embodiment, a BS is provided. The BS includes a transceiver configured to receive, from a user equipment (UE), (i) for each layer l of a plurality of v layers, an indicator $i_{1,6,l}$ indicating indices of $M_l$ bases included in a basis subset and (ii) based on a condition not being satisfied, an indicator $i_{1,5}$ indicating indices of N' bases included in an intermediate basis set (IntS). The BS further includes a processor operably connected to the transceiver. The processor is configured to: when the condition is satisfied, use the indicator $i_{1,6,l}$ to determine, from a full basis set, $M_l$ bases included in the basis subset for each layer l of the plurality of v layers; and when the condition is not satisfied, use the indicator $i_{1,5}$ to determine, from the full basis set, N' bases included in the intermediate basis set (IntS) that are common among the plurality of v layers, and use the received indicator $i_{1,6,l}$ to determine, from the intermediate basis set, $M_l$ bases included in the basis subset for each layer l of the plurality of v layers, wherein the full basis set comprises $N_3$ bases, and wherein $N_3$, N', and $M_l$ are positive integers; $M_l<N_3$ when the condition is satisfied and $M_l<N'<N_3$ when the condition is not satisfied; $l \in \{1, \ldots, v\}$; and $v \geq 1$ is a rank value.

In yet another embodiment, a method for operating a UE is provided. The method comprises: in response to a condition being satisfied, selecting, from a full basis set, a basis subset comprising $M_l$ bases for each layer l of a plurality of v layers; in response to the condition not being satisfied, selecting, from the full basis set, an intermediate basis set (IntS) comprising N' bases that are common among the plurality of v layers, and selecting, from the selected intermediate basis set, the basis subset comprising $M_l$ bases for each layer l of the plurality of v layers; transmitting, to a base station (BS), for each layer l of the plurality of v layers, an indicator $i_{1,6,l}$ indicating indices of the $M_l$ bases included in the selected basis subset; and based on the condition not being satisfied, transmitting, to the BS, an indicator $i_{1,5}$ indicating indices of the N' bases included in the selected intermediate basis set (IntS); wherein the full basis set comprises $N_3$ bases, wherein $N_3$, N', and $M_l$ are positive integers; $M_l<N_3$ when the condition is satisfied and $M_l<N'<N_3$ when the condition is not satisfied; $l \in \{1, \ldots, v\}$; and $v \geq 1$ is a rank value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
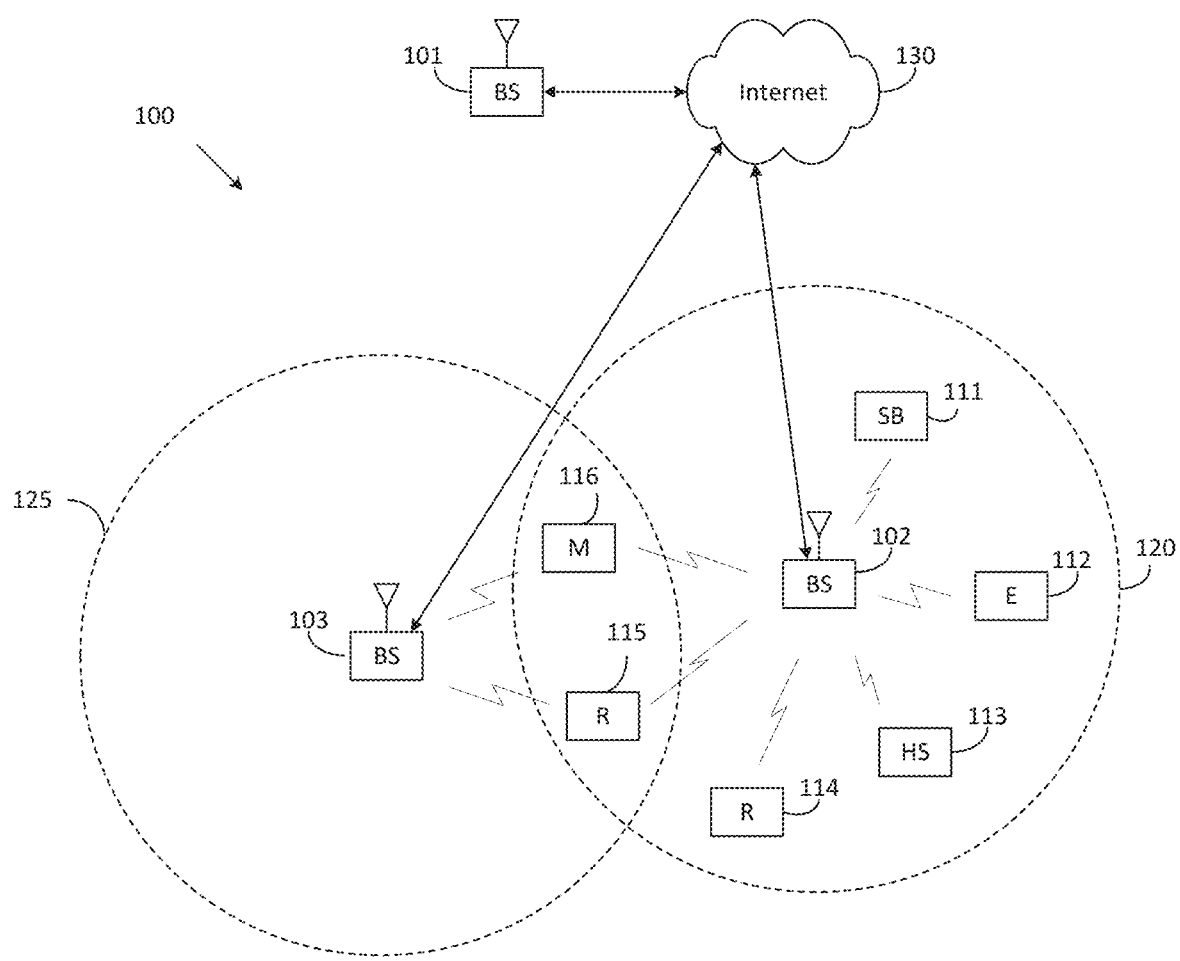
FIG. 1 illustrates an example wireless network according to embodiments of the present disclosure.

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.0.0, "E-UTRA, Physical channels and modulation;" 3GPP TS 36.212 v16.0.0, "E-UTRA, Multiplexing and Channel coding;" 3GPP TS 36.213 v16.0.0, "E-UTRA, Physical Layer Procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) protocol specification;" 3GPP TR 22.891 v14.2.0; 3GPP TS 38.211 v16.0.0, "E-UTRA, NR, Physical channels and modulation;" 3GPP TS 38.213 v16.0.0, "E-UTRA, NR, Physical Layer Procedures for control;" 3GPP TS 38.214 v16.0.0, "E-UTRA, NR, Physical layer procedures for data;" and 3GPP TS 38.212 v16.0.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
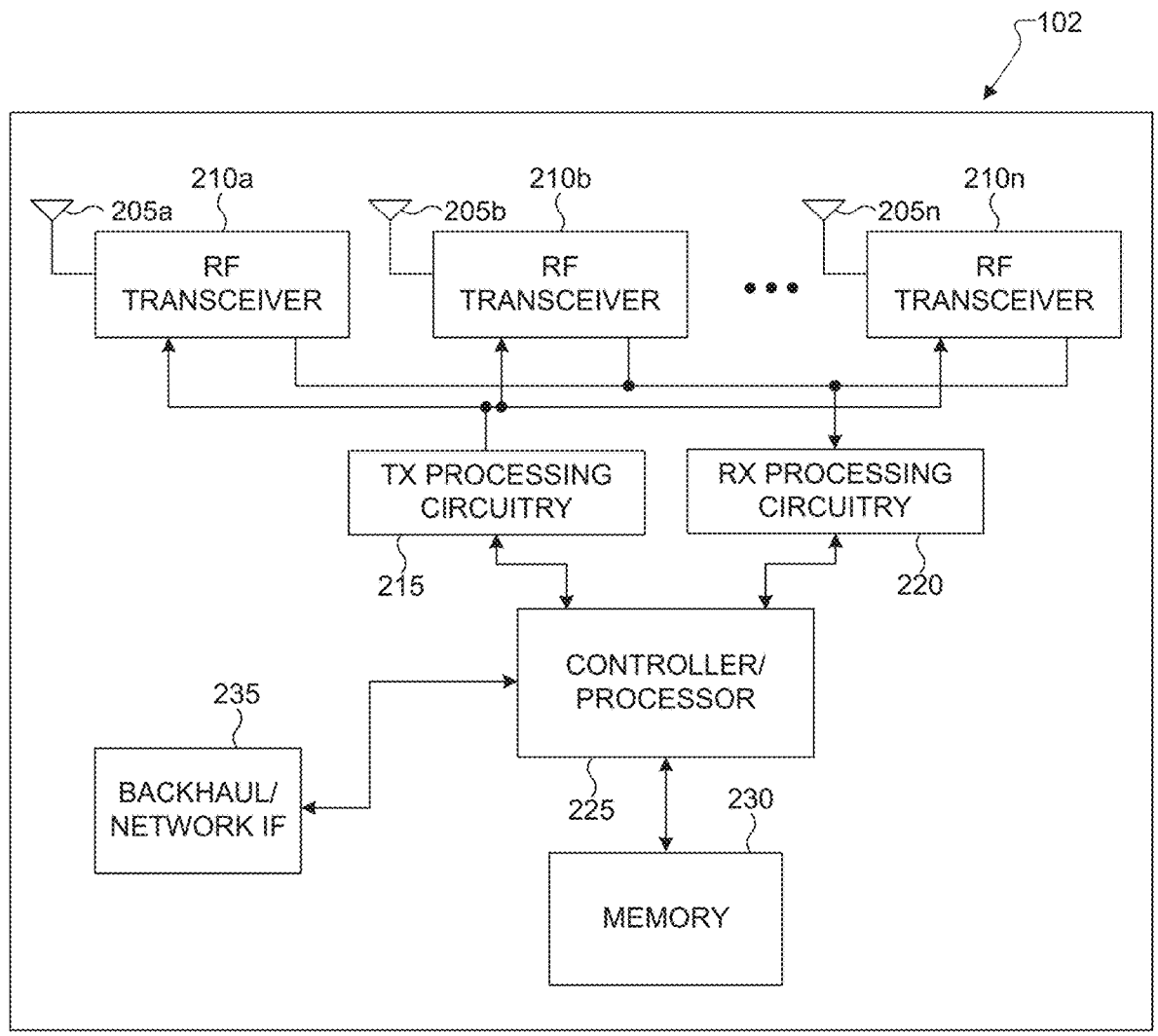
FIG. 2 illustrates an example gNB according to embodiments of the present disclosure.
Figure 3:
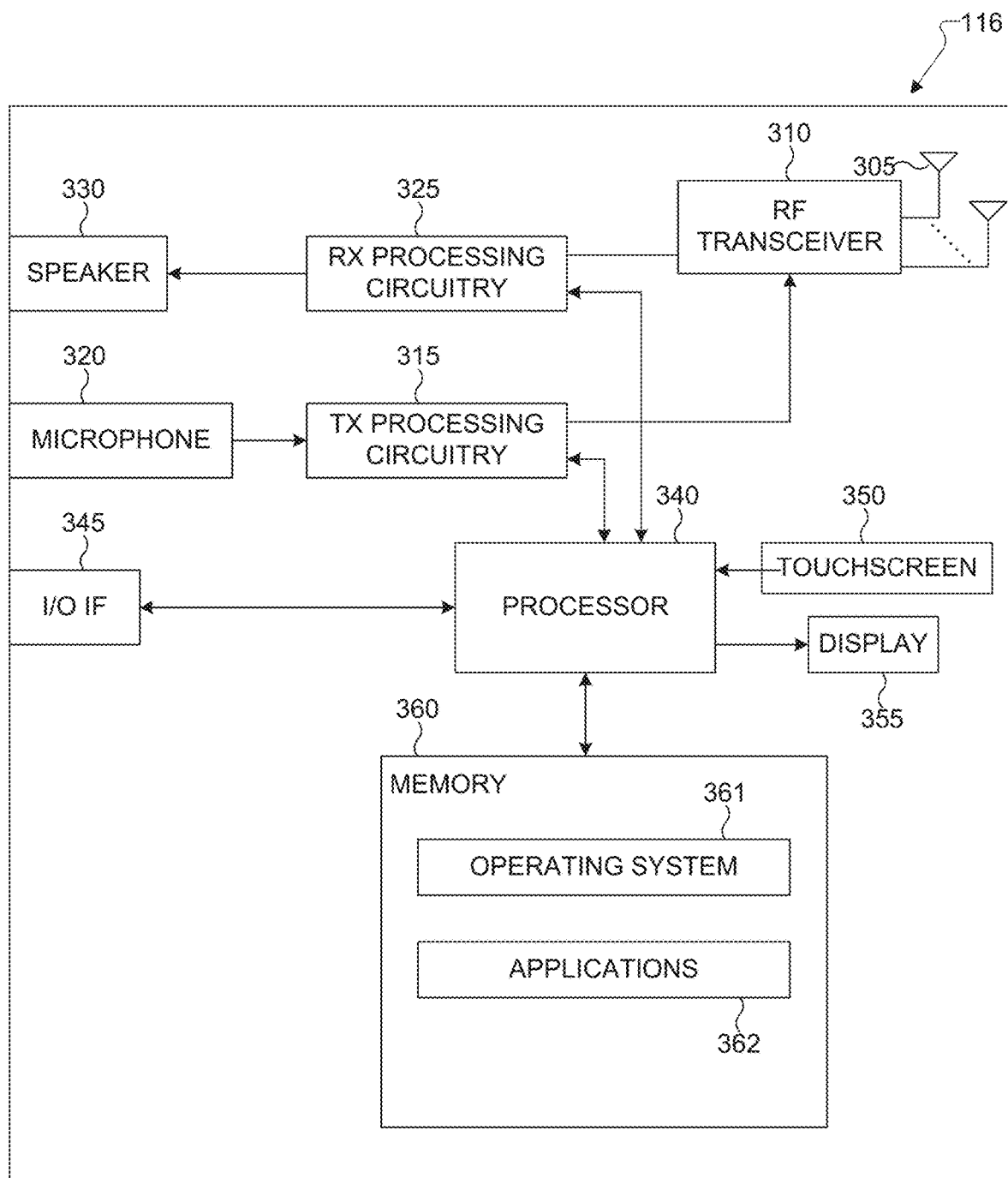
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions. As described in more detail below, one or more of the UEs 111-116 include circuitry, programming, or a combination thereof, to enable CSI reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX)

processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
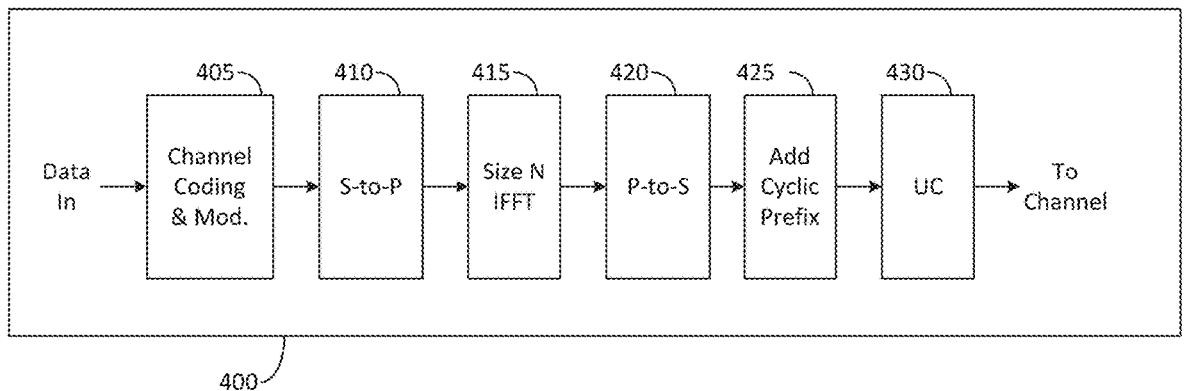
FIG. 4A illustrates a high-level diagram of an orthogonal frequency division multiple access transmit path according to embodiments of the present disclosure.
Figure 4B:
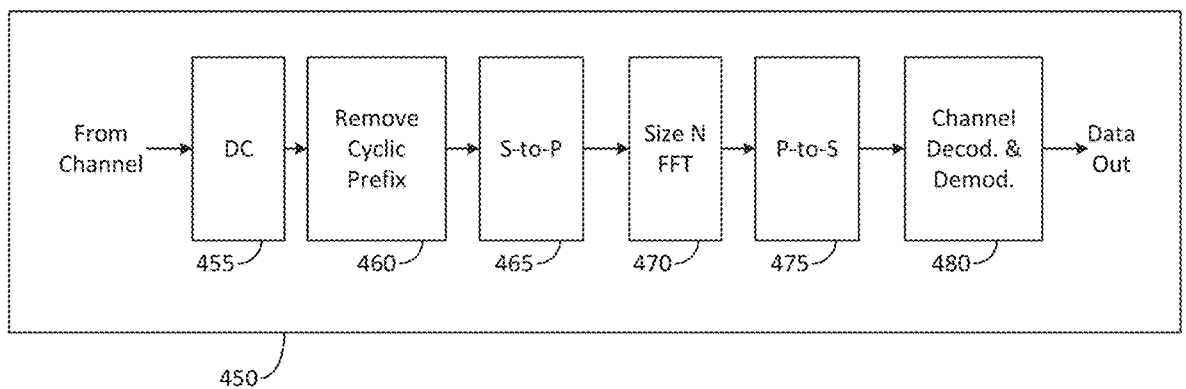
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
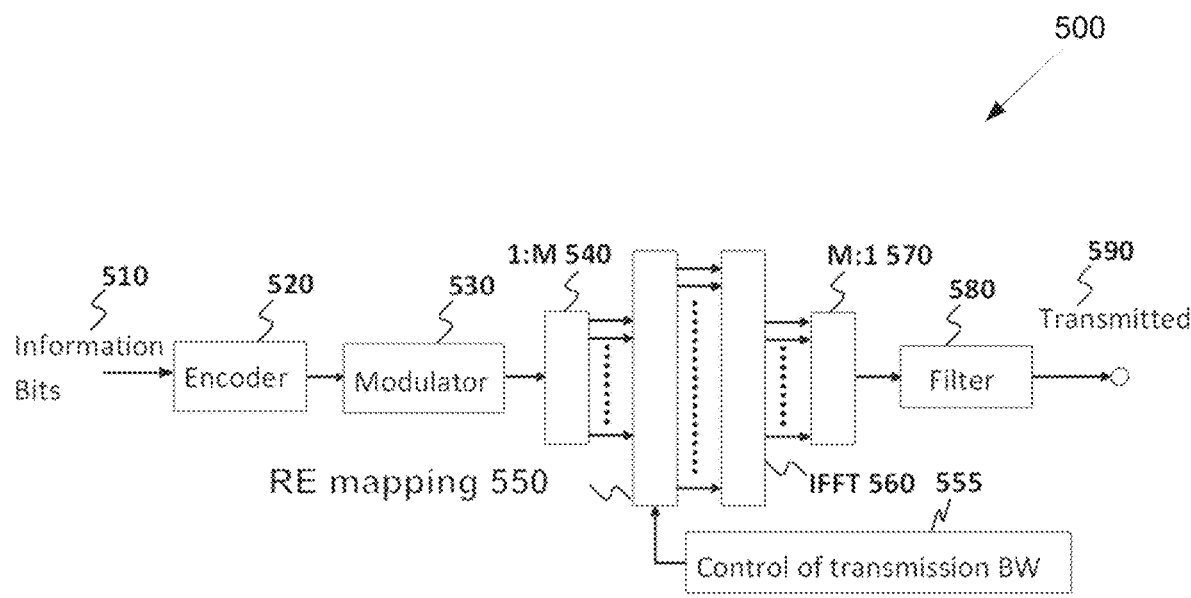
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
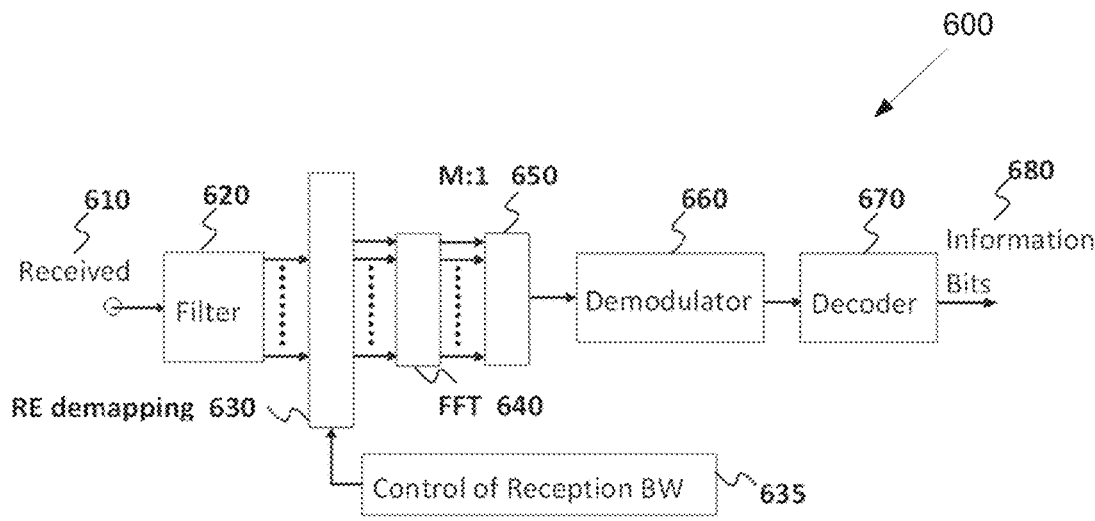
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
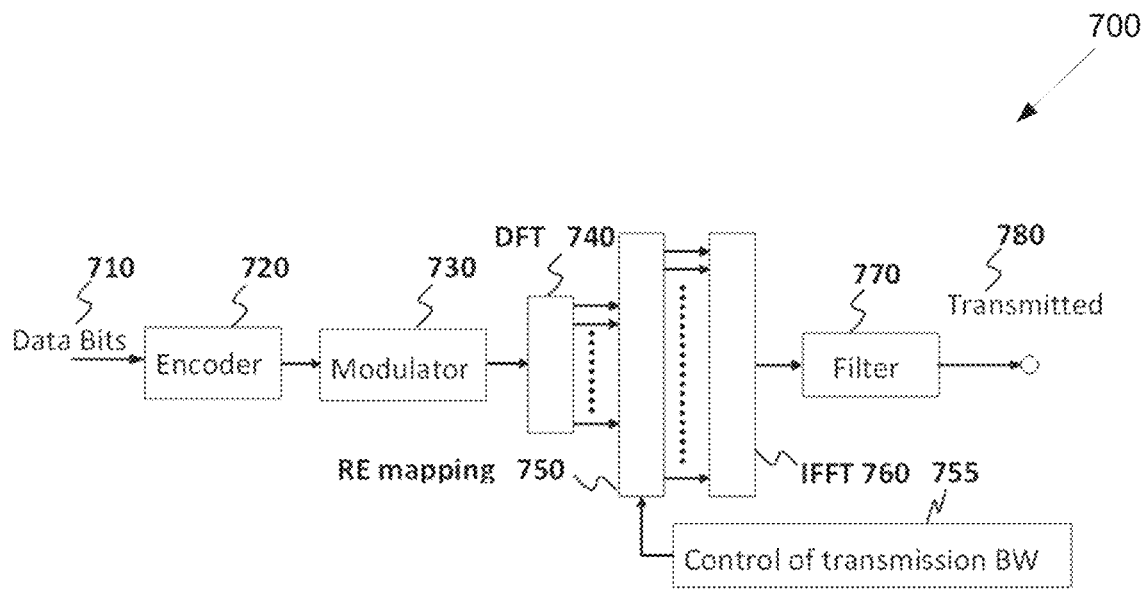
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
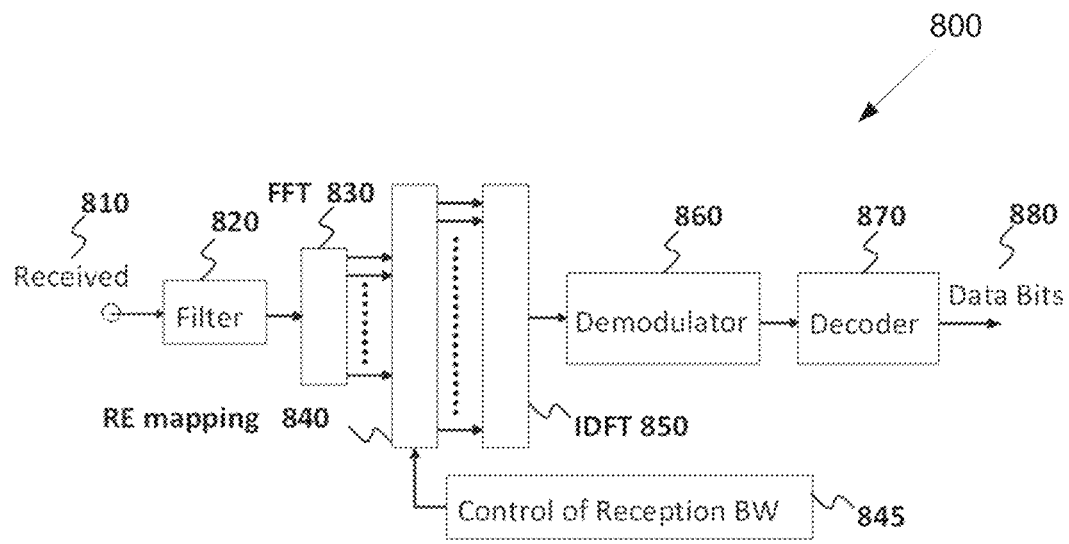
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

Figure 9:
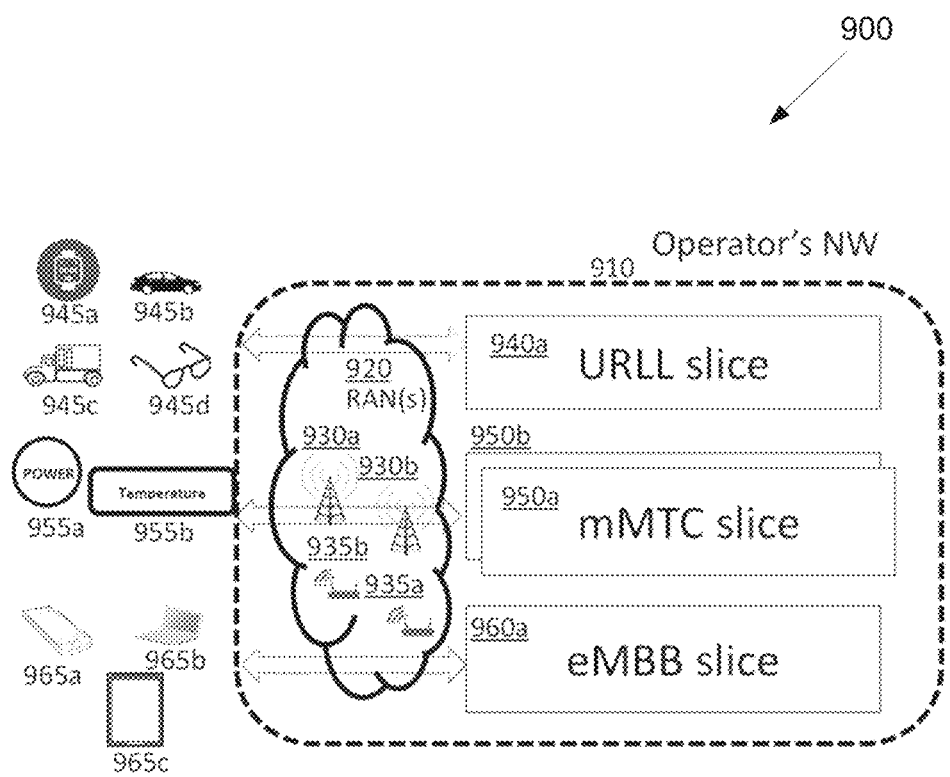
FIG. 9 illustrates an example network configuration according to embodiments of the present disclosure.

FIG. 9 illustrates an example network configuration 900 according to embodiments of the present disclosure. The embodiment of the network configuration 900 illustrated in FIG. 9 is for illustration only. FIG. 9 does not limit the scope of this disclosure to any particular implementation of the configuration 900.

In order for the 5G network to support such diverse services with different quality of services (QoS), one scheme has been identified in 3GPP specification, called network slicing.

As shown in FIG. 9, an operator's network 910 includes a number of radio access network(s) 920 (RAN(s)) that are associated with network devices such as gNBs 930*a* and 930*b*, small cell base stations (femto/pico gNBs or Wi-Fi access points) 935*a* and 935*b*. The network 910 can support various services, each represented as a slice.

In the example, an URLL slice 940*a* serves UEs requiring URLL services such as cars 945*b*, trucks 945*c*, smart watches 945*a*, and smart glasses 945*d*. Two mMTC slices 950*a* and 950*b* serve UEs requiring mMTC services such as power meters 955*a*, and temperature control box 955*b*. One eMBB slice 960*a* serves UEs requiring eMBB services such as cells phones 965*a*, laptops 965*b*, and tablets 965*c*. A device configured with two slices can also be envisioned.

To utilize PHY resources efficiently and multiplex various slices (with different resource allocation schemes, numerologies, and scheduling strategies) in DL-SCH, a flexible and self-contained frame or subframe design is utilized.

Figure 10:
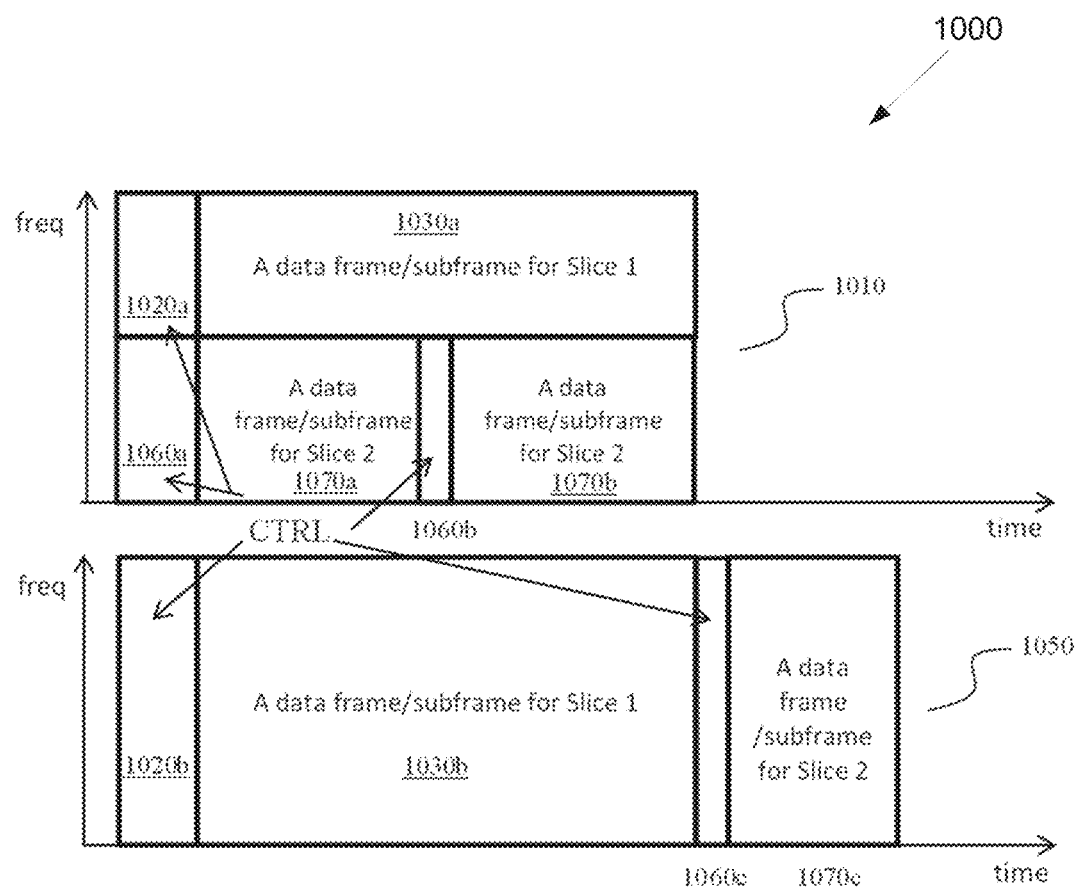
FIG. 10 illustrates an example multiplexing of two slices according to embodiments of the present disclosure.

FIG. 10 illustrates an example multiplexing of two slices 1000 according to embodiments of the present disclosure. The embodiment of the multiplexing of two slices 1000 illustrated in FIG. 10 is for illustration only. One or more of the components illustrated in FIG. 5 can be implemented in specialized circuitry configured to perform the noted functions or one or more of the components can be implemented by one or more processors executing instructions to perform the noted functions. FIG. 10 does not limit the scope of this disclosure to any particular implementation of the multiplexing of two slices 1000.

Two exemplary instances of multiplexing two slices within a common subframe or frame are depicted in FIG. 10. In these exemplary embodiments, a slice can be composed of one or two transmission instances where one transmission instance includes a control (CTRL) component (e.g., 1020*a*, 1060*a*, 1060*b*, 1020*b*, or 1060*c*) and a data component (e.g., 1030*a*, 1070*a*, 1070*b*, 1030*b*, or 1070*c*). In embodiment 1010, the two slices are multiplexed in frequency domain whereas in embodiment 1050, the two slices are multiplexed in time domain.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 11:
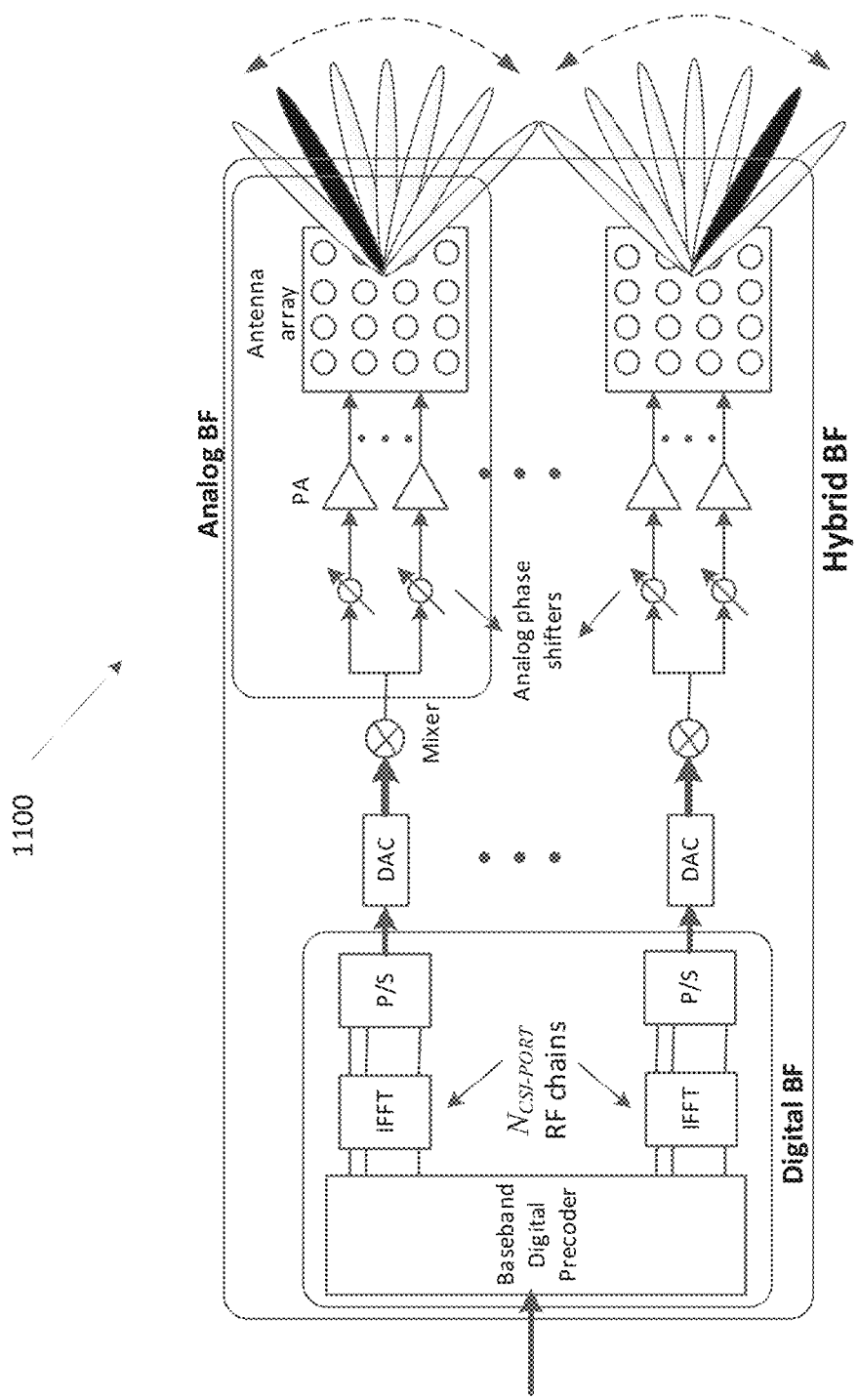
FIG. 11 illustrates an example antenna blocks according to embodiments of the present disclosure.

FIG. 11 illustrates an example antenna blocks 1100 according to embodiments of the present disclosure. The embodiment of the antenna blocks 1100 illustrated in FIG. 11 is for illustration only. FIG. 11 does not limit the scope of this disclosure to any particular implementation of the antenna blocks 1100.

For mmWave bands, although the number of antenna elements can be larger for a given form factor, the number of CSI-RS ports which can correspond to the number of digitally precoded ports tends to be limited due to hardware constraints (such as the feasibility to install a large number of ADCs/DACs at mmWave frequencies) as illustrated in FIG. 11. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or sub-frames. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands (SBs) or resource blocks.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO.

Figure 12:
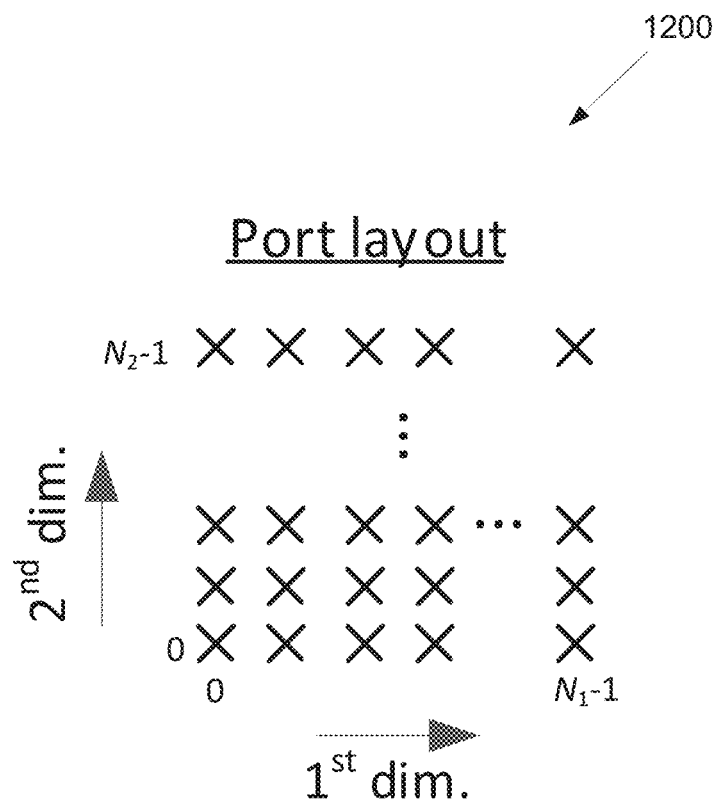
FIG. 12 illustrates an example antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout 1200.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. patent application Ser. No. 15/490,561, filed Apr. 18, 2017 and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
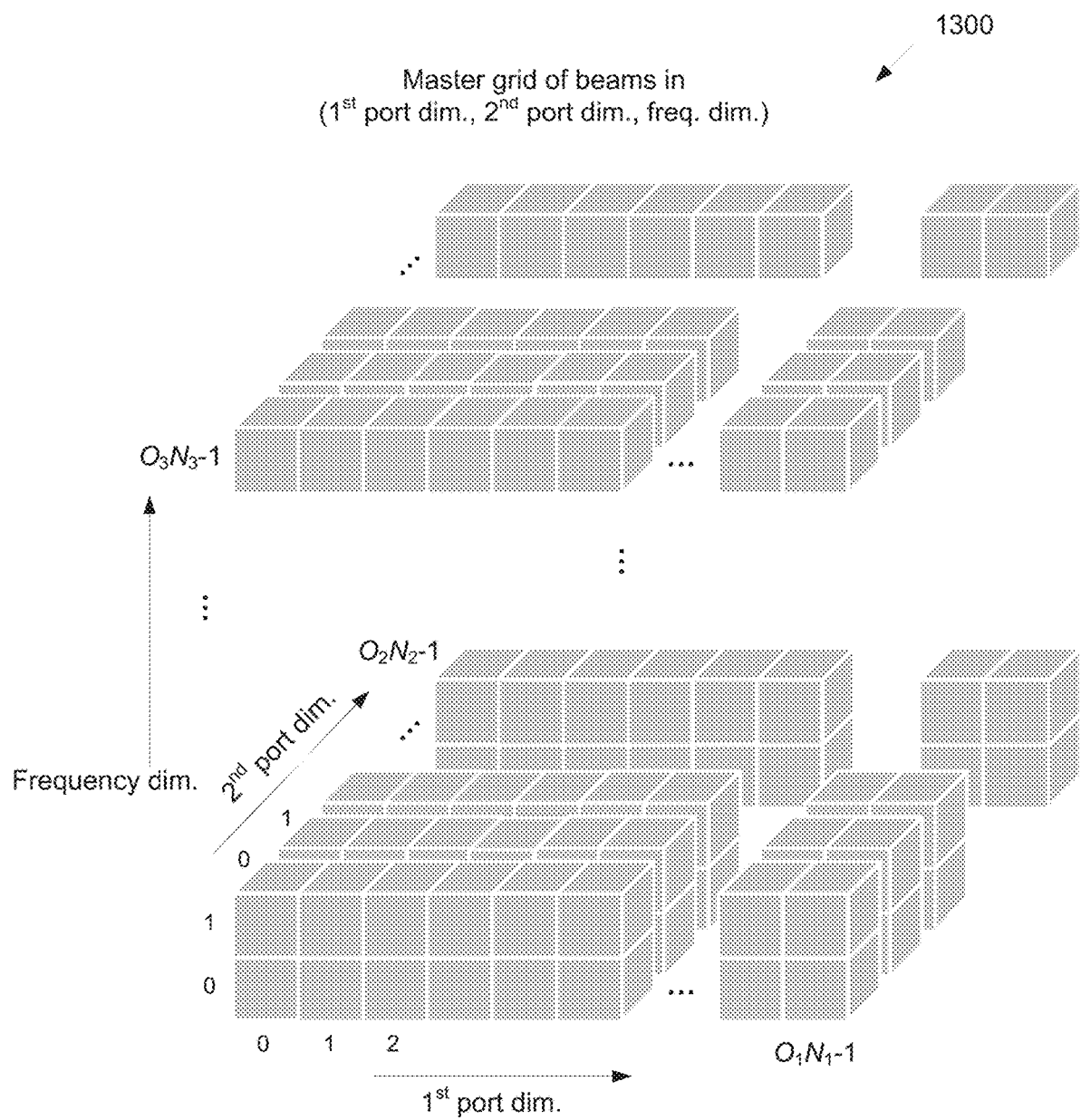
FIG. 13 illustrates an example 3D grid of oversampled DFT beams according to embodiments of the present disclosure.

FIG. 13 illustrates a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all SBs and for a given layer l=1, . . . , υ, where υ is the associated RI value, is given by either $$W^l = AC_l B^H = [a_0 \ a_1 \ \dots \ a_{L-1}] \begin{Bmatrix} c_{l,0,0} & c_{l,0,1} & \dots & c_{l,0,M-1} \\ c_{l,1,0} & c_{l,1,1} & \dots & c_{l,1,M-1} \\ \vdots & \vdots & \vdots & \vdots \\ c_{l,L-1,0} & c_{l,L-1,1} & \dots & c_{l,L-1,M-1} \end{Bmatrix} [b_0 \ b_1 \ \dots \ b_{M-1}]^H = \quad \text{(Eq. 1)}$$

$$\sum_{m=0}^{M-1} \sum_{i=0}^{L-1} c_{l,i,m}(a_i b_m^H) = \sum_{i=0}^{L-1} \sum_{m=0}^{M-1} c_{l,i,m}(a_i b_m^H),$$

or $$W^l = \begin{bmatrix} A & 0 \\ 0 & A \end{bmatrix} c_l B^H = \begin{bmatrix} a_0 \ a_1 \ \dots \ a_{L-1} & 0 \\ 0 & a_0 \ a_1 \ \dots \ a_{L-1} \end{bmatrix} \quad \text{(Eq. 2)}$$

$$\begin{bmatrix} c_{l,0,0} & c_{l,0,1} & \dots & c_{l,0,M-1} \\ c_{l,1,0} & c_{l,1,1} & \dots & c_{l,1,M-1} \\ \vdots & \vdots & \vdots & \vdots \\ c_{l,L-1,0} & c_{l,L-1,1} & \dots & c_{l,L-1,M-1} \end{bmatrix}$$

$$[b_0 \ b_1 \ \dots \ b_{M-1}]^H = \begin{bmatrix} \sum_{m=0}^{M-1} \sum_{i=0}^{L-1} c_{l,i,m}(a_i b_m^H) \\ \sum_{m=0}^{M-1} \sum_{i=1}^{L-1} c_{l,i+L,m}(a_i b_m^H) \end{bmatrix},$$

where $N_1$ is a number of antenna ports in a first antenna port dimension, $N_2$ is a number of antenna ports in a second antenna port dimension, $N_3$ is a number of SBs or frequency domain (FD) units/components for PMI reporting (that comprise the CSI reporting band), which can be different (e.g., less than) from a number of SBs for CQI reporting.

$a_i$ is a $2N_1 N_2 \times 1$ (Eq. 1) or $N_1 N_2 \times 1$ (Eq. 2) column vector, $b_m$ is a $N_3 \times 1$ column vector, $c_{l,i,m}$ is a complex coefficient.

In a variation, when a subset K<2LM coefficients (where K is either fixed, configured by the gNB or reported by the UE), then the coefficient $c_{l,i,m}$ in precoder equations Eq. 1 or Eq. 2 is replaced with $v_{l,i,m} \times c_{l,i,m}$, where $v_{l,i,m}=1$ if the coefficient $c_{l,i,m}$ is non-zero, hence reported by the UE according to some embodiments of this disclosure.

$v_{l,i,m}=0$ otherwise (i.e., $c_{l,i,m}$ is zero, hence not reported by the UE).

The indication whether $v_{l,i,m}=1$ or 0 is according to some embodiments of this disclosure.

In a variation, the precoder equations Eq. 1 or Eq. 2 are respectively generalized to $$W^l = \sum_{i=0}^{L-1} \sum_{m=0}^{M_i-1} c_{l,i,m}(a_i b_{i,m}^H) \quad \text{(Eq. 3)}$$

and $$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix} \quad \text{(Eq. 4)}$$

where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \le M$ (where $\{M_i\}$ or $\Sigma M_i$ is either fixed, configured by the gNB or reported by the UE).

The columns of $W^l$ are normalized to norm one. For rank R or R layers ($\upsilon$=R), the pre-coding matrix is given by $$W^{(R)} = \frac{1}{\sqrt{R}} [ W^1 \ W^2 \ \dots \ W^R ].$$

Eq. 2 is assumed in the rest of the disclosure. The embodiments of the disclosure, however, are general and are also applicable to Eq. 1, Eq. 3 and Eq. 4.

$L \le 2N_1 N_2$ and $K \le N_3$. If $L=2N_1 N_2$, then A is an identity matrix, and hence not reported. Likewise, if $K=N_3$, then B is an identity matrix, and hence not reported. Assuming $L<2N_1 N_2$, in an example, to report columns of A, the oversampled DFT codebook is used. For instance, $a_i = v_{l,m}$ where the quantity $V_{l,m}$ is given by:

$$u_m = \begin{cases} \begin{bmatrix} 1 & e^{j\frac{2\pi m}{O_2 N_2}} & \dots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T.$$

Similarly, assuming $K<N_3$, in an example, to report columns of B, the oversampled DFT codebook is used. For instance, $b_k = w_k$, where the quantity $w_k$ is given by:

$$w_k = \begin{bmatrix} 1 & e^{j\frac{2\pi k}{O_3 N_3}} & \dots & e^{j\frac{2\pi k(N_3-1)}{O_3 N_3}} \end{bmatrix}.$$

In another example, discrete cosine transform DCT basis is used to construct/report basis B for the 3$^{rd}$ dimension. The m-th column of the DCT compression matrix is simply given by $$[W_f]_{nm} = \begin{cases} \frac{1}{\sqrt{K}}, n = 0 \\ \sqrt{\frac{2}{K}} \cos\frac{\pi(2m+1)n}{2K}, n = 1, \dots K-1 \end{cases}, \text{ and}$$

$K = N_3$, and $m = 0, \dots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'TypeIII-PortSelection' for an enhanced Type II CSI reporting in which the pre-coders for all SBs and for a given layer l=1, . . . , v, where v is the associated RI value, is given by $W^l=AC_lB^H$, where $N_1$, $N_2$, $N_3$, and $C_{l,i,k}$ are defined as above except that the matrix A comprises port selection vectors. For instance, the L antenna ports per polarization or column vectors of A are selected by the index $q_l$, where $$q_l \in \left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits}),$$

and the value of d is configured with the higher layer parameter PortSelectionSamplingSize, where $d \in \{1,2,3,4\}$ and $$d \le \min\left(\frac{P_{CSI-RS}}{2}, L\right).$$

To report columns of A, the port selection vectors are used, For instance, $a_i=v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as follows.

$$W^l=AC_lB^H=W_1\tilde{W}_2W_f^H, \quad (5)$$

where $A=W_1$ corresponds to the $W_1$ in Type II CSI codebook, i.e., $$W_1 = \begin{bmatrix} A & 0 \\ 0 & A \end{bmatrix}$$

and $B=W_f$. The $C=\tilde{W}_2$ matrix consists of all the required linear combination coefficients (e.g., amplitude and phase or real or imaginary). Each reported coefficient ($c_{l,i,m}=p_{l,i,m}\phi_{l,i,m}$) in $\tilde{W}_2$ is quantized as amplitude coefficient ($p_{l,i,m}$) and phase coefficient ($\phi_{l,i,m}$).

In one example, the spatial domain (SD) beams or basis vectors are reported in a layer-common manner, i.e., a set of L SD basis vectors are reported by the UE that are common for all layers $l=0, 1, \ldots, v-1$, where v is the RI value reported by the UE. The set of L SD basis vectors are reported via part 2 of a two-part UCI comprising UCI part 1 and UCI part 2. For example, this reporting is via a SD basis subset indicator $$i_{SD} \in \left\{0, 1, \ldots, \binom{N_1N_2}{L}-1\right\},$$

similar to L beam reporting. In one example, $i_{SD}$ is a component of the first PMI $i_1$.

In one example, the frequency domain (SD) beams or basis vectors are reported in a layer-specific manner, i.e., a set of $M_l$ FD basis vectors are reported by the UE independently for each layer $l=0, 1, \ldots, v-1$. For each layer $l \in \{0, 1, \ldots, v-1\}$, the set of $M_l$ FD basis vectors are reported via part 2 of a two-part UCI comprising UCI part 1 and UCI part 2. For example, this reporting is via a FD basis subset indicator $i_{FD}=[i_{FD,0}\ i_{FD,1}\ \ldots\ i_{FD,v-1}]$, where $i_{FD,l}$ is a FD basis subset indicator for layer l. In one example, $i_{FD}$ is a component of the first PMI $i_1$.

In one example, the set of $M_l$ FD basis vectors are reported from an orthogonal DFT codebook comprising $N_3$ DFT vectors $$w_k = \begin{bmatrix} 1 & e^{j\frac{2\pi k}{N_3}} & \ldots & e^{j\frac{2\pi k(N_3-1)}{N_3}} \end{bmatrix},$$

where $k=0, 1, \ldots, N_3-1$. In one example, $N_3=R \times N_{SB}$ where R is higher layer configured from $\{1,2\}$, and $N_{SB}$ is number of SBs for configured for CQI reporting. In another example, $N_3$ is the smallest integer such that $N_3 \ge R \times N_{SB}$ and $N_3$ is a multiple of 2 or 3 or 5.

In one example, $$M_l = \left\lceil p_l \times \frac{N_3}{R} \right\rceil.$$

In another example, $M_l=\lceil p_l \times N_{SB} \rceil$. Here $p_l$ is a fraction, for example, $$p_l \in \left\{\frac{1}{4}, \frac{1}{2}\right\} \text{ or } p_l \in \left\{\frac{1}{8}, \frac{1}{4}, \frac{1}{2}\right\}.$$

Several embodiments about the reporting details of the FD basis vectors are proposed.

In embodiment 0, for each layer $l \in \{0, 1, \ldots, v-1\}$, the set of $M_l$ FD basis vectors are reported by the UE according to at least one of the following alternatives.

In one alternative Alt 0-0: the FD basis subset selection indicator $i_{FD,l}$ is a $$\left\lceil \log_2 \binom{N_3}{M_l} \right\rceil \text{-bit}$$

indicator, where $$i_{FD,l} \in \left\{0, 1, \ldots, \binom{N_3}{M_l}-1\right\}.$$

In one alternative Alt 0-1: the FD basis subset selection indicator $i_{FD,l}$ is a $$\left\lceil \log_2 \binom{N_3-1}{M_l-1} \right\rceil \text{-bit indicator}$$

where $$i_{FD,l} \in \left\{0, 1, \ldots, \binom{N_3-1}{M_l-1}-1\right\}.$$

In this alternative, one of the FD basis vectors is always fixed, and hence not reported by the UE. In one example, this fixed FD basis vector is FD basis vector with index=0.

In one alternative Alt 0-2: the FD basis subset selection indicator $i_{FD,l}$ is a size-$N_3$ bitmap, where $i_{FD,l}$ $b_0 b_1 \ldots b_{N_3}$, and the set of $M_l$ FD basis vectors are indicated by reporting $M_l$ of these bits $b_i$'s to one and the rest to zero. Alternatively, the set of $M_l$ FD basis vectors are indicated by reporting $M_l$ of these bits $b_i$'s to zero and the rest to one.

In embodiment 1, a two-step FD basis subset selection method is used. The first step uses an intermediate FD basis set comprising $N'_3$ basis vectors (where $N'_3 \leq N_3$). The value $N'_3$ is either reported by the UE (e.g. via part 1 of a two-part UCI) or fixed or higher-layer configured. The intermediate FD basis set is a common pool of FD basis vectors for all layers, and is reported via part 2 of a two-part UCI. The starting index ($M_{initial}$) of the intermediate FD basis set is indicated via a $\lceil \log_2 N_3 \rceil$-bit indicator. The indices of the FD basis vectors in this intermediate FD basis set is given by mod ($M_{initial}+n$, $N_3$), $n=0, 1, \ldots, N'_3-1$. In one example, $N'_3=N'$. The notation $N'_3$ and $N'$ are used interchangeably in this disclosure.

In the second step, for each layer $l \in \{0, 1, \ldots, v-1\}$ or $l \in \{1, \ldots, v\}$, the set of $M_l$ FD basis vectors are reported by the UE from the intermediate FD basis set according to at least one of the following alternatives.

In one alternative Alt 1-0: the FD basis subset selection indicator $i_{FD,l}$ is a $$\left\lceil \log_2 \binom{N'_3}{M_l} \right\rceil \text{-bit}$$

indicator, where $$i_{FD,l} \in \left\{ 0, 1, \ldots, \binom{N'_3}{M_l} - 1 \right\}.$$

In one alternative Alt 1-1: the FD basis subset selection indicator $i_{FD,l}$ is a $$\left\lceil \log_2 \binom{N'_3}{M_l - 1} \right\rceil \text{ or } \left\lceil \log_2 \binom{N'_3 - 1}{M_l - 1} \right\rceil \text{-bit}$$

indicator, where $$i_{FD,l} \in \left\{ 0, 1, \ldots, \binom{N'_3}{M_l - 1} - 1 \text{ or } \binom{N'_3 - 1}{M_l - 1} - 1 \right\}.$$

In this alternative, one of the FD basis vectors is always fixed, and hence not reported by the UE. In one example, this fixed FD basis vector is FD basis vector with index=0.

In one alternative Alt 1-2: the FD basis subset selection indicator $i_{FD,l}$ is a size-$N'_3$ bitmap, where $i_{FD,l}=b_0 b_1 \ldots b_{N'_3}$, and the set of $M_l$ FD basis vectors are indicated by reporting M of these bits $b_i$'s to one and the rest to zero. Alternatively, the set of $M_l$ FD basis vectors are indicated by reporting M of these bits $b_i$'s to zero and the rest to one.

In embodiment 1A, which is a variation of embodiment 1, the starting index ($M_{initial}$) of the intermediate FD basis set is fixed, hence not reported by the UE. At least one of the following alternatives is used.

In one alternative Alt 1A-0: $M_{initial}=0$ indicating the FD component 0.

In one alternative Alt 1A-1:

$$M_{initial} = N_3 - \left\lceil \frac{N'_3}{2} \right\rceil + 1.$$

In one alternative Alt 1A-2:

$$M_{initial} = N_3 - \left\lceil \frac{N'_3}{2} \right\rceil + \Delta + 1,$$

where $\Delta$ is either fixed, e.g., $\Delta=1$, or determined based on other parameters such as $N'_3$.

In one alternative Alt 1A-3:

$$M_{initial} = N_3 - \left\lceil \frac{N'_3}{2} \right\rceil + \Delta,$$

where $\Delta$ is either fixed, e.g., $\Delta=1$, or determined based on other parameters such as $N'_3$.

In one alternative Alt 1A-4:

$$M_{initial} = N_3 - \left\lfloor \frac{N'_3}{2} + 1 \right\rfloor.$$

In one alternative Alt 1A-5:

$$M_{initial} = N_3 - \left\lfloor \frac{N'_3}{2} \right\rfloor + \Delta + 1,$$

where $\Delta$ is either fixed, e.g., $\Delta=1$, or determined based on other parameters such as $N'_3$.

In one alternative Alt 1A-6:

$$M_{initial} = N_3 - \left\lfloor \frac{N'_3}{2} \right\rfloor + \Delta,$$

where $\Delta$ is either fixed, e.g., $\Delta=1$, or determined based on other parameters such as $N'_3$.

In embodiment 1B, which is a variation of embodiment 1, the starting index ($M_{initial}$) of the intermediate FD basis set is higher-layer configured, hence not reported by the UE. At least one of the following alternatives is used.

In one alternative Alt 1B-0: $M_{initial}$ is higher-layer configured.

In one alternative Alt 1B-1:

$$M_{initial} = N_3 - \left\lceil \frac{N'_3}{2} \right\rceil + \Delta + 1,$$

where $\Delta$ is higher-layer configured.

In one alternative Alt 1B-2:

$$M_{initial} = N_3 - \left\lfloor \frac{N'_3}{2} \right\rfloor + \Delta + 1,$$

where $\Delta$ is higher-layer configured.

In one alternative Alt 1B-3:

$$M_{initial} = N_3 - \left\lfloor \frac{N'_3}{2} \right\rfloor + \Delta,$$

where $\Delta$ is higher-layer configured.

In one alternative Alt 1B-4:

$$M_{initial} = N_3 - \left\lfloor \frac{N'_3}{2} \right\rfloor + \Delta,$$

where $\Delta$ is higher-layer configured.

At least one of the following examples is used as the set of candidate values for $\Delta$.
In one example, $\Delta \in \{-1,1\}$ or $\{-2,2\}$
In one example, $\Delta \in \{-1,0\}$ or $\{-2,0\}$
In one example, $\Delta \in \{0,1\}$ or $\{0,2\}$
In one example, $\Delta \in \{-1,0,1\}$
In one example, $\Delta \in \{-2,0,2\}$
In one example, $\Delta \in \{-2,-1,0,1\}$
In one example, $\Delta \in \{-1,0,1,2\}$
In one example, $\Delta \in \{-2,-1,0,1,2\}$ In Embodiment 1C, which is a variation of embodiment 1, the starting index ($M_{initial}$) of the intermediate FD basis set is reported by the UE. At least one of the following alternatives is used.

In one alternative Alt 1C-0: $M_{initial}$ is reported via a $\log_2 N_3$-bit indicator.

In one alternative Alt 1C-1:

$$M_{initial} = N_3 - \left\lceil \frac{N'_3}{2} \right\rceil + \Delta + 1,$$

where $\Delta$ is reported by the UE via a $\lceil \log_2 B \rceil$-bit indicator.

In one alternative Alt 1C-2:

$$M_{initial} = N_3 - \left\lfloor \frac{N'_3}{2} \right\rfloor + \Delta + 1,$$

where $\Delta$ is reported by the UE via a $\lceil \log_2 B \rceil$-bit indicator.

In one alternative Alt 1C-3:

$$M_{initial} = N_3 - \left\lceil \frac{N'_3}{2} \right\rceil + \Delta,$$

where $\Delta$ is reported by the UE via a $\lceil \log_2 B \rceil$-bit indicator.

In one alternative Alt 1C-4:

$$M_{initial} = N_3 - \left\lfloor \frac{N'_3}{2} \right\rfloor + \Delta,$$

where $\Delta$ is reported by the UE via a $\lceil \log_2 B \rceil$-bit indicator.
B is the number of candidate values for $\Delta$. At least one of the following is used as the set of candidate values for $\Delta$.
B=2, hence a $\lceil \log_2 2 \rceil$-bit or 1-bit indicator is reported by the UE.
Ex: $\Delta \in \{-1,1\}$ or $\{-2,2\}$
Ex: $\Delta \in \{-1,0\}$ or $\{-2,0\}$
Ex: $\Delta \in \{0,1\}$ or $\{0,2\}$
B=3, hence a $\log_2 3$ 1-bit or 2-bit indicator is reported by the UE.
Ex: $\Delta \in \{-1,0,1\}$
Ex: $\Delta \in \{-2,0,2\}$
B=4, hence a $\log_2 4$ 1-bit or 2-bit indicator is reported by the UE.
Ex: $\Delta \in \{-2,-1,0,1\}$
Ex: $\Delta \in \{-1,2\}$
B=5, hence a $\lceil \log_2 5 \rceil$-bit or 3-bit indicator is reported by the UE.
Ex: $\Delta \in \{-2,-1,0,1,2\}$ In embodiment 2, a two-step FD basis subset selection method is used. The first step uses an intermediate FD basis set comprising $N'_3$ basis vectors (where $N'_3 \leq N_3$). The value $N'_3$ is either reported by the UE (e.g. via part 1 of a two-part UCI or fixed or higher-layer configured. The intermediate FD basis set is a common pool of FD basis vectors for all layers, and is reported via part 2 of a two-part UCI. The intermediate FD basis set is selected from multiple higher-layer configured intermediate sets.

In the second step, for each layer $l \in \{0, 1, \ldots, v-1\}$, the set of $M_l$ FD basis vectors are reported by the UE from the selected intermediate FD basis set according to at least one of the alternatives Alt 1-0, 1-1, and 1-2.

In embodiment 3, for each layer $l \in \{, 1, \ldots, v-1\}$, the set of $M_l$ FD basis vectors are reported by the UE, where the starting index ($M_{l,initial}$) of the FD basis set is indicated via a $\lceil \log_2 N_3 \rceil$-bit indicator. The indices of the FD basis vectors is given by $\mod(M_{l,initial}+n, N_3)$, $n=0, 1, \ldots, M_l-1$.

In embodiment 4, an intermediate FD basis set comprising $N_3$ basis vectors is higher layer configured, where $N_3$ is fixed, hence not reported. The intermediate FD basis set is common for all RI values, and for all layers (hence, RI-common and layer-common). For each layer $l \in \{0, 1, \ldots, v-1\}$, the set of $M_l$ FD basis vectors are reported by the UE from the intermediate FD basis set according to at least one of the following alternatives.

In one alternative Alt 4-0: the FD basis subset selection indicator $i_{FD,l}$ is a $$\left\lceil \log_2 \binom{N'_3}{M_l} \right\rceil \text{-bit}$$

indicator, where $$i_{FD,l} \in \left\{0, 1, \ldots, \binom{N'_3}{M_l}-1\right\}.$$

In one alternative Alt 4-1: the FD basis subset selection indicator $i_{FD,l}$ is a $$\left\lceil \log_2 \binom{N'_3}{M_l - 1} \right\rceil \text{-bit}$$

indicator, where $$i_{FD,l} \in \left\{0, 1, \ldots, \binom{N'_3}{M_l - 1} - 1\right\}.$$

In this alternative, one of the FD basis vectors is always fixed, and hence not reported by the UE. In one example, this fixed FD basis vector is FD basis vector with index=0.

In one alternative Alt 4-2: the FD basis subset selection indicator $i_{FD,l}$ is a size-N'$_3$ bitmap, where $i_{FD,l}=b_0 b_1 \ldots b_N$, and the set of $M_l$ FD basis vectors are indicated by reporting $M_l$ of these bits $b_i$'s to one and the rest to zero. Alternatively, the set of $M_l$ FD basis vectors are indicated by reporting $M_l$ of these bits $b_i$'s to zero and the rest to one.

In embodiment 4A, which is a variation of embodiment 4, an intermediate FD basis set of size N'$_3$ is higher layer configured for each rank or RI value, and for a given RI value, the intermediate FD basis set is common for all layers (hence, RI-specific and layer-common). For each layer $l \in \{0, 1, \ldots, v-1\}$, the set of $M_l$ FD basis vectors are reported by the UE from the respective intermediate FD basis set according to at least one of the alternatives Alt 4-0, 4-1, and 4-2.

In embodiment 4B, which is a variation of embodiment 4, an intermediate FD basis set of size N'$_3$ is higher layer configured for each layer value, and for a given layer value, the intermediate FD basis set is common for all ranks or RI values (hence, RI-common and layer-specific). For each layer $l \in \{0, 1, \ldots, v-1\}$, the set of $M_l$ FD basis vectors are reported by the UE from the respective intermediate FD basis set according to at least one of the alternatives Alt 4-0, 4-1, and 4-2.

In embodiment 4C, which is a variation of embodiment 4, an intermediate FD basis set of size N$_3$ is higher layer configured for each layer value, and for each RI or rank value, (hence, RI-specific and layer-specific). For each layer $l \in \{0, 1, \ldots, v-1\}$, the set of $M_l$ FD basis vectors are reported by the UE from the respective intermediate FD basis set according to at least one of the alternatives Alt 4-0, 4-1, and 4-2.

In embodiment 5, a two-step FD basis subset selection method is used. The first step uses an intermediate FD basis set comprising N$_3$ basis vectors (where N'$_3 \le$ N$_3$). The value N$_3$ is either reported by the UE (e.g. via part 1 of a two-part UCI or fixed or higher-layer configured. The intermediate FD basis set is a common pool of FD basis vectors for all layers, and is reported via part 2 of a two-part UCI. In one example, the FD basis vectors in this intermediate set is the union of FD basis vectors for all layers, and they are reported by the UE from an orthogonal DFT codebook comprising N$_3$ DFT vectors according to at least one of the following alternatives.

In one alternative Alt 5-0: The intermediate FD basis set indicator $i_{FD,interm}$ is a $$\left\lceil \log_2 \binom{N_3}{N'_3} \right\rceil \text{ bit}$$

indicator, where $$i_{FD,interm} \in \left\{0, 1, \ldots, \binom{N_3}{N'_3} - 1\right\}.$$

In one alternative Alt 5-1: The intermediate FD basis set indicator $i_{FD,interm}$ is a $$\left\lceil \log_2 \binom{N_3 - 1}{N'_3 - 1} \right\rceil \text{-bit}$$

indicator, where $$i_{FD,interm} \in \left\{0, 1, \ldots, \binom{N_3 - 1}{N'_3 - 1} - 1\right\}.$$

In this alternative, one of the FD basis vectors is always fixed, and hence not reported by the UE. In one example, this fixed FD basis vector is FD basis vector with index=0.

In one alternative Alt 5-2: The intermediate FD basis set indicator $i_{FD,interm}$ is a size-N$_3$ bitmap, where $i_{FD,interm}=b_0 b_1 \ldots b_{N_3}$, and the intermediate set of N$_3$' FD basis vectors are indicated by reporting N$_3$' of these bits $b_i$'s to one and the rest to zero. Alternatively, the set of N$_3$' FD basis vectors are indicated by reporting N$_3$' of these bits $b_i$'s to zero and the rest to one.

In the second step, for each layer $l \in \{0, 1, \ldots, v-1\}$, the set of $M_l$ FD basis vectors are reported by the UE from the intermediate FD basis set according to at least one of the alternatives Alt 1-0, 1-1, and 1-2.

In embodiment 6, a UE is configured to report the FD basis vectors either (A) without using any FD intermediate basis set or equivalently N'$_3$=N$_3$ (e.g. according to embodiment 0) or (B) using an FD intermediate basis set (e.g. according to embodiment 1-5) based on a condition. At least one of the following alternatives is used for the condition.

In one alternative Alt 6-0: (A) is used when N$_3 \le$ x, and (B) is used when N$_3 \ge$ x, where x is a threshold.

In one alternative Alt 6-1: (A) is used when N$_3 <$ x, and (B) is used when N$_3 >$ x, where x is a threshold.

In one alternative Alt 6-2: (A) is used when N$_{SB} \le$ x, and (B) is used when N$_{SB} \ge$ x, where x is a threshold.

In one alternative Alt 6-3: (A) is used when N$_{SB} <$ x, and (B) is used when N$_{SB} \ge$ x, where x is a threshold.

The threshold x is either fixed, or configured, or reported by the UE. In one example, when x is fixed, then x=19 for Alt 6-0 and 6-1, and x=10 or 13 for Alt 6-2 and 6-3. Note that when (A) is used, there is no need for any intermediate basis set configuration/reporting.

In embodiment 6A, a UE is configured to report the FD basis vectors either (A) without using any FD intermediate basis set or equivalently N'$_3$=N$_3$ (e.g. according to embodiment 0) or (B) using an FD intermediate basis set (e.g. according to embodiment 1-5) based on a condition on the higher layer configured value R. In one alternative, (A) is used when R=1, and (B) is used when R=2. In another alternative, $$N'_3 = \frac{N_3}{R} \text{ or } \left\lceil \frac{N_3}{R} \right\rceil.$$

In another alternative, $$N'_3 = \left\lceil \frac{N_3}{2} \right\rceil.$$

In embodiment 6AA, a UE is configured to report the FD basis vectors either (A) without using any FD intermediate basis set or equivalently $N'_3 = N_3$ (e.g. according to embodiment 0) or (B) using an FD intermediate basis set (e.g. according to embodiment 1-5) based on a condition on the higher layer configured value R and another condition on $N_3$ or $N_{SB}$. At least one of the following alternatives is used.

In one alternative Alt 6AA-0: (A) is used when $N_3 \leq x$ and R=1, and (B) is used otherwise, where x is a threshold.

In one alternative Alt 6AA-1: (A) is used when $N_3 < x$ and R=1, and (B) is used otherwise, where x is a threshold.

In one alternative Alt 6AA-2: (A) is used when $N_{SB} \leq x$ and R=1, and (B) is used when $N_{SB} > x$, where x is a threshold.

In one alternative Alt 6AA-3: (A) is used when $N_{SB} < x$ and R=1, and (B) is used when $N_{SB} \geq x$, where x is a threshold.

In one alternative Alt 6AA-4: (A) is used when $N_3 \leq x$ or R=1, and (B) is used otherwise, where x is a threshold.

In one alternative Alt 6AA-5: (A) is used when $N_3 < x$ or R=1, and (B) is used otherwise, where x is a threshold.

In one alternative Alt 6AA-6: (A) is used when $N_{SB} \leq x$ or R=1, and (B) is used when $N_{SB} > x$, where x is a threshold.

In one alternative Alt 6AA-7: (A) is used when $N_{SB} < x$ or R=1, and (B) is used when $N_{SB} \geq x$, where x is a threshold.

In embodiment 6B, a UE is configured to report the FD basis vectors either (A) without using any FD intermediate basis set or equivalently $N'_3 = N_3$ (e.g. according to embodiment 0) or (B) using an FD intermediate basis set (e.g. according to embodiment 1-5) based on explicit higher layer signaling.

In embodiment 6C, a UE is configured to report the FD basis vectors either (A) without using any FD intermediate basis set or equivalently $N'_3 = N_3$ (e.g. according to embodiment 0) or (B) using an FD intermediate basis set (e.g. according to embodiment 1-5) based on UE capability signaling. That is, the UE reports in its capability signaling whether it supports (A), (B), or both. Or, the UE reports in its capability signaling whether it supports (A), or both (A) and (B). When the UE supports both (A) and (B), then one of (A) and (B) is configured to the UE via higher layer signaling.

In embodiment 6D, a UE is configured to report the FD basis vectors either (A) without using any FD intermediate basis set or equivalently $N'_3 = N_3$ (e.g. according to embodiment 0) or (B) using an FD intermediate basis set (e.g. according to embodiment 1-5) based on the rank or RI value. In one example, the UE reports the FD basis vectors according to (A) when RI<3 (i.e., RI∈{1,2}), and the UE reports the FD basis vectors according to (B) when RI>2 (e.g. RI∈{3,4}). In another example, the UE reports the FD basis vectors according to (A) when RI<2 (i.e. RI=1), and the UE reports the FD basis vectors according to (B) when RI>1 (i.e., RI≥2 or RI∈{2,3,4}).

In embodiment 6E, a UE is configured to report the FD basis vectors either (A) using an FD intermediate basis set according to embodiment X or (B) using an FD intermediate basis set according to embodiment Y, where X≠Y, based on a condition. At least one of the following alternatives is used for the condition.

In one alternative Alt 6E-0: (A) is used when $N_3 \leq x$, and (B) is used when $N_3 > x$, where x is a threshold.

In one alternative Alt 6E-1: (A) is used when $N_3 < x$, and (B) is used when $N_3 \geq x$, where x is a threshold.

In one alternative Alt 6E-2: (A) is used when $N_{SB} \leq x$, and (B) is used when $N_{SB} > x$, where x is a threshold.

In one alternative Alt 6E-3: (A) is used when $N_{SB} < x$, and (B) is used when $N_{SB} \geq x$, where x is a threshold.

The threshold x is either fixed, or configured, or reported by the UE. In one example, when x is fixed, then x=19 for Alt 6-0 and 6-1, and x=10 or 13 for Alt 6-2 and 6-3. Note that when (A) is used, there is no need for any intermediate basis set configuration/reporting. At least one of the examples (Ex) in Table 1 is used for the value (X, Y). In one example, only one value for (X, Y) is supported, e.g. 6E-16 for (X, Y)=(5, 1). In another example, more than one values for (X, Y) are supported, and one of the supported values is configured, e.g., via higher layer signaling.

TABLE 1

Example for the value (X, Y).

| Ex | X | Y |
|---|---|---|
| 6E-0 | 1 | 2 |
| 6E-1 | 1 | 3 |
| 6E-2 | 1 | 4 |
| 6E-3 | 1 | 5 |
| 6E-4 | 2 | 1 |
| 6E-5 | 2 | 3 |
| 6E-6 | 2 | 4 |
| 6E-7 | 2 | 5 |
| 6E-8 | 3 | 1 |
| 6E-9 | 3 | 2 |
| 6E-10 | 3 | 4 |
| 6E-11 | 3 | 5 |
| 6E-12 | 4 | 1 |
| 6E-13 | 4 | 2 |
| 6E-14 | 4 | 3 |
| 6E-15 | 4 | 5 |
| 6E-16 | 5 | 1 |
| 6E-17 | 5 | 2 |
| 6E-18 | 5 | 3 |
| 6E-19 | 5 | 4 |

In embodiment 6EE, a UE is configured to report the FD basis vectors either (A) using an FD intermediate basis set according to embodiment X or (B) using an FD intermediate basis set according to embodiment Y, where X≠Y, based on a condition on the higher layer configured value R. In one alternative, (A) is used when R=1, and (B) is used when R=2. In another alternative $$N'_3 = \frac{N_3}{R} \text{ or } \left\lceil \frac{N_3}{R} \right\rceil.$$

In another alternative, $$N'_3 = \left\lceil \frac{N_3}{2} \right\rceil.$$

At least one of the examples (Ex) in Table 1 is used for the value (X, Y). In one example, only one value for (X, Y) is supported, e.g. 6E-16 for (X, Y)=(5, 1). In another example, more than one values for (X, Y) are supported, and one of the supported values is configured, e.g., via higher layer signaling.

In embodiment 6EEE, a UE is configured to report the FD basis vectors either (A) using an FD intermediate basis set according to embodiment X or (B) using an FD intermediate basis set according to embodiment Y, where X≠Y, based on a condition on the higher layer configured value R and another condition on $N_3$ or $N_{SB}$. At least one of the following alternatives is used.

In one alternative Alt 6EEE-0: (A) is used when $N_3 \leq x$ and R=1, and (B) is used otherwise, where x is a threshold.

In one alternative Alt 6EEE-1: (A) is used when $N_3<x$ and R=1, and (B) is used otherwise, where x is a threshold.

In one alternative Alt 6EEE-2: (A) is used when $N_{SB} \le x$ and R=1, and (B) is used when $N_{SB}>x$, where x is a threshold.

In one alternative Alt 6EEE-3: (A) is used when $N_{SB}<x$ and R=1, and (B) is used when $N_{SB} \ge x$, where x is a threshold.

In one alternative Alt 6EEE-4: (A) is used when $N_3 \le x$ or R=1, and (B) is used otherwise, where x is a threshold.

In one alternative Alt 6EEE-5: (A) is used when $N_3<x$ or R=1, and (B) is used otherwise, where x is a threshold.

In one alternative Alt 6EEE-6: (A) is used when $N_{SB} \le x$ or R=1, and (B) is used when $N_{SB}>x$, where x is a threshold.

In one alternative Alt 6EEE-7: (A) is used when $N_{SB}<x$ or R=1, and (B) is used when $N_{SB} \ge x$, where x is a threshold.

At least one of the examples (Ex) in Table 1 is used for the value (X, Y). In one example, only one value for (X, Y) is supported, e.g. 6E-16 for (X, Y)=(5, 1). In another example, more than one values for (X, Y) are supported, and one of the supported values is configured, e.g., via higher layer signaling.

In embodiment 6F, a UE is configured to report the FD basis vectors either (A) using an FD intermediate basis set according to embodiment X or (B) using an FD intermediate basis set according to embodiment Y, where X≠Y, based on explicit higher layer signaling. At least one of the examples (Ex) in Table 1 is used for the value (X, Y). In one example, only one value for (X, Y) is supported, e.g. 6E-16 for (X, Y)=(5, 1). In another example, more than one values for (X, Y) are supported, and one of the supported values is configured, e.g., via higher layer signaling.

In embodiment 6G, a UE is configured to report the FD basis vectors either (A) using an FD intermediate basis set according to embodiment X or (B) using an FD intermediate basis set according to embodiment Y, where X≠Y, based on UE capability signaling. That is, the UE reports in its capability signaling whether it supports (A), (B), or both. Or, the UE reports in its capability signaling whether it supports (A), or both (A) and (B). When the UE supports both (A) and (B), then one of (A) and (B) is configured to the UE via higher layer signaling. At least one of the examples (Ex) in Table 1 is used for the value (X, Y). In one example, only one value for (X, Y) is supported, e.g. 6E-16 for (X, Y)=(5, 1). In another example, more than one values for (X, Y) are supported, and one of the supported values is configured, e.g., via higher layer signaling.

In embodiment 6H, a UE is configured to report the FD basis vectors either (A) using an FD intermediate basis set according to embodiment X or (B) using an FD intermediate basis set according to embodiment Y, where X≠Y, based on the rank or RI value. In one example, the UE reports the FD basis vectors according to (A) when RI<3 (i.e., RI∈{1,2}), and the UE reports the FD basis vectors according to (B) when RI>2 (e.g. RI∈{3,4}). In another example, the UE reports the FD basis vectors according to (A) when RI<2 (i.e. RI=1), and the UE reports the FD basis vectors according to (B) when RI>1 (i.e., RI>2 or RI∈{2,3,4}). At least one of the examples (Ex) in Table 1 is used for the value (X, Y). In one example, only one value for (X, Y) is supported, e.g. 6E-16 for (X, Y)=(5, 1). In another example, more than one values for (X, Y) are supported, and one of the supported values is configured, e.g., via higher layer signaling.

In embodiment 7, the value $N_3$ to determine the size of the FD intermediate basis set is determined according to at least one of the following alternatives.

In one alternative Alt 7-0:

$$N'_3 = \left\lceil y \times \frac{N_3}{R} \right\rceil$$

is fixed.

In one alternative Alt 7-1: $N'_3 = \lceil y \times N_3 \rceil$ is fixed.
In one alternative Alt 7-2: $N'_3 = \lceil y \times N_{SB} \rceil$ is fixed.
In one alternative Alt 7-3: $N'_3 = \lceil y \times R \times N_{SB} \rceil$ is fixed.
In one alternative Alt 7-4:

$$N'_3 = \left\lceil \frac{N_3}{R} \right\rceil$$

is fixed.

In one alternative Alt 7-5: $N'_3 = N_{SB}$ is fixed.
In one alternative Alt 7-6: N is higher-layer configured.
In one alternative Alt 7-7: N is reported by the UE (e.g. via part 1 of the two-part UCI).
In one alternative Alt 7-8: N is signaled via L1/L2 DL control signaling such as MAC CE or UL related DCI (together with CSI request). In one example, $N'_3$ is signaled from a set of candidate values. In another example, the candidate values of $N'_3$ are incorporated into the trigger state definition.

In one alternative Alt 7-9: $N'_3=M$ is fixed, where $$M = \left\lceil p \times \frac{N_3}{R} \right\rceil$$

is number of FD units comprising columns of coefficient matrix $C_l$, and p is higher layer configured, for example, from $\{¼, ½\}$.

y is either fixed (e.g. to ¾), or configured, or reported by the UE.

In one alternative Alt 7-0-0, which is a sub-alternative of Alt 7-0, $$N'_3 = \left\lceil y \times \frac{N_3}{R} \right\rceil$$

and y is determined according to at least one of the following examples.

In one example Ex 7-0-0-0: y is fixed. In one example, y=¾. In another example, y=p+a, where a is fixed, e.g., a=¼. In another example, y=a×p, where a is fixed, e.g., a=2. In another example, y=p+a for rank 1-2 and y=$v_0$+a for rank 3-4, where a is fixed, e.g., a=¼. In another example, y=a×p for rank 1-2 and y=a×$v_0$ for rank 3-4, where a is fixed, e.g., a=2. Here, p is higher-layer configured to determine number of FD components $$M = \left\lceil p \times \frac{N_3}{R} \right\rceil$$

for rank 1-2, and $v_0$ is higher-layer configured to determine number of FD components $$M_0 = \left\lceil v_0 \times \frac{N_3}{R} \right\rceil$$

for rank 3-4. In one example, p belongs to $\{1/4, 1/2\}$ and $v_0$ belongs to

In one example Ex 7-0-0-1: y is higher-layer configured.

In one example Ex 7-0-0-1A, y is configured independently (separately) using a separate parameter which takes values from $\{y_1, y_2\}$. At least one of the following is used.
- $\{y_1, y_2\}$ is independent of p value, e.g., $\{y_1, y_2\}=\{2/3, 3/4\}$ or $\{5/8, 3/4\}$ or $\{1/2, 3/4\}$ or $\{1, 3/4\}$
- $\{y_1, y_2\}$ depends on p value, e.g., if $p=1/4$, $\{y_1, y_2\}=\{1/2, 3/4\}$ and if $p=1/2$, $\{y_1, y_2\}=\{2/3, 3/4\}$ or $\{5/8, 3/4\}$.

In one example Ex 7-0-0-1B, y is configured implicitly (i.e., no separate higher layer parameter is used) via a higher-layer parameter. At least one of the following is used.
- y is configured implicitly via higher layer parameter p. At least one of the following is used.
  - $y=p+a$, where a is fixed, e.g., $a=1/4$
  - $y=a \times p$, where a is fixed, e.g., $a=2$
- y is configured implicitly via higher layer parameter (p, $v_0$). At least one of the following is used.
  - $y=p+a$ for rank 1-2 and $y=v_0+a$ for rank 3-4, where a is fixed, e.g., $a=1/4$
  - $y=a \times p$ for rank 1-2 and $y=a \times v_0$ for rank 3-4, where a is fixed, e.g., $a=2$ In one example Ex 7-0-0-1C, y is configured jointly with at least one higher-layer parameter. At least one of the following is used.
- y is configured jointly with higher layer parameter p $(p, y)=\{(1/4, 1/2), (1/2, 3/4)\}$.
- y is configured jointly with higher layer parameter (p, $v_0$). At least one of the following is used.
  - $(p, v_0, y)=\{(1/4, 1/4, 1/2), (1/2, 1/4, 3/4)\}$
  - $(p, v_0, y)=\{(1/4, 1/8, 1/2), (1/2, 1/4, 1/2), (1/2, 1/4, 3/4)\}$
  - $(p, v_0, y)=\{(1/4, 1/8, 1/2), (1/2, 1/4, 3/4)\}$
  - $(p, v_0, y)=\{(1/4, 1/8, 1/2), (1/4, 1/4, 1/2), (1/2, 1/4, 3/4), (1/2, 1/8, 3/4)\}$ In one example Ex 7-0-0-2: y is reported in UCI part 1

In one example Ex 7-0-0-2A: a 1-bit indication is used to indicate one of the two supported values $\{y_1, y_2\}$. At least one of the following is used.
- The two supported values are fixed. At least one of the following is used.
  - $\{y_1, y_2\}$ is independent of p value, e.g., $\{y_1, y_2\}=\{2/3, 3/4\}$ or $\{5/8, 3/4\}$ or $\{1/2, 3/4\}$
  - $\{y_1, y_2\}$ depends on p value, e.g., if $p=1/4$, $\{y_1, y_2\}=\{1/2, 3/4\}$ and if $p=1/2$, $\{y_1, y_2\}=\{2/3, 3/4\}$ or $\{5/8, 3/4\}$.
- The two supported values are higher-layer configured, e.g., from $\{1/2, 5/8, 2/3, 3/4, 1\}$.

In one alternative Alt 7-7-0, which is a sub-alternative of Alt 7-7, y is reported in UCI part 1 via a $\lceil \log_2(N_3-M+Z) \rceil$-bit indication. At least one of the following is used.
- $Z=-1$, and the indication indicates a value in $\{M_1+1, M_1+2, \ldots, N_3-2, N_3-1\}$
- $Z=0$, and the indication indicates a value in $\{M_1, M_1+1, M_1+2, \ldots, N_3-2, N_3-1\}$
- $Z=0$, and the indication indicates a value in $\{M_1+1, M_1+2, \ldots, N_3-2, N_3-1, N_3\}$
- $Z=1$, and the indication indicates a value in $\{M_1, M_1+1, M_1+2, \ldots, N_3-2, N_3-1, N_3\}$.

In one alternative Alt 7-9-0, which is a sub-alternative of Alt 7-9, $N'_3=\lceil y \times M \rceil$ or $y \times M$ and y is determined according to at least one of the following examples.

In one example Ex 7-9-0-0: y is fixed. In one example, $y=Z=1.5$. In one example, $y=2$.

In one example Ex 7-9-0-1: y is higher-layer configured.

In one example Ex 7-9-0-1A, y is configured independently (separately) using a separate parameter which takes values from $\{y_1, y_2\}$, e.g., $\{y_1, y_2\}=\{3/2, 5/4\}$ or $\{1, 3/2\}$ In one example Ex 7-9-0-1B, y is configured implicitly (i.e., no separate higher layer parameter is used) via a higher-layer parameter. At least one of the following is used.
- y is configured implicitly via higher layer parameter p. For example, when $p=1/4$, $y=2$ and when $p=1/2$, $y=3/2$.
- y is configured implicitly via higher layer parameter (p, $v_0$). For example, for rank 1-2, when $p=1/4$, $y=2$ and when $p=1/2$, $y=3/2$; and for rank 3-4, when $v_0=1/4$, $y=2$ and when $v_0=1/8$, $y=2$ or 4.

In one example Ex 7-9-0-1C, y is configured jointly with at least one higher-layer parameter. At least one of the following is used.
- y is configured jointly with higher layer parameter p $(p, y)=\{(1/4, 2), (1/2, 3/2)\}$.
- y is configured jointly with higher layer parameter (p, $v_0$). At least one of the following is used.
  - $(p, v_0, y)=\{(1/4, 1/4, 2), (1/2, 1/4, 3/2)\}$.
  - $(p, v_0, y)=\{(1/4, 1/8, 2), (1/4, 1/4, 2), (1/2, 1/4, 3/2)\}$.
  - $(p, v_0, y)=\{(1/4, 1/8, 2), (1/2, 1/4, 3/2)\}$.
  - $(p, v_0, y)=\{(1/4, 1/4, 2), (1/4, 1/4, 2), (1/2, 1/4, 3/2), (1/2, 1/8, 3/2)\}$.

In one example Ex 7-9-0-2: y is reported in UCI part 1

In one example Ex 7-9-0-2A: a 1-bit indication is used to indicate one of the two supported values $\{y_1, y_2\}$. At least one of the following is used.
- The two supported values are fixed. At least one of the following is used.
  - $\{y_1, y_2\}$ is independent of p value, e.g., $\{y_1, y_2\}=\{3/2, 2\}$ or $\{3/2, 1\}$ or $\{3/2, 5/4\}$
  - $\{y_1, y_2\}$ depends on p value, e.g., if $p=1/4$, $\{y_1, y_2\}=\{3/2, 2\}$ and if $p=1/2$, $\{y_1, y_2\}=\{3/2, 1\}$ or $\{3/2, 5/4\}$.
- The two supported values are higher-layer configured, e.g., from $\{3/2, 5/4, 1, 2\}$.

In one alternative Alt 7-1-0, which is a sub-alternative of Alt 7-1, $N'_3=\lceil y \times N_3 \rceil$ or $y \times N_3$ or $\lceil y \times N_{SB} \rceil$ or $y \times N_{SB}$ and y is determined according to at least one of the following examples.

In one example Ex 7-1-0-0: y is fixed. In one example, $y=3/4=0.75$.

In one example Ex 7-1-0-1: y is higher-layer configured.

In one example Ex 7-1-0-1A, y is configured independently (separately) using a separate parameter which takes values from $\{y_1, y_2\}$, e.g., $\{y_1, y_2\}=\{2/3, 3/4\}$ or $\{5/8, 3/4\}$ or $\{1/2, 3/4\}$ or $\{1, 3/4\}$ In one example Ex 7-1-0-1B, y is configured implicitly (i.e., no separate higher layer parameter is used) via a higher-layer parameter. At least one of the following is used.
- y is configured implicitly via higher layer parameter p. At least one of the following is used.
  - $y=p+a$, where a is fixed, e.g., $a=1/4$
  - $y=a \times p$, where a is fixed, e.g., $a=2$
- y is configured implicitly via higher layer parameter (p, $v_0$). At least one of the following is used.
  - $y=p+a$ for rank 1-2 and $y=v_0+a$ for rank 3-4, where a is fixed, e.g., $a=1/4$
  - $y=a \times p$ for rank 1-2 and $y=a \times v_0$ for rank 3-4, where a is fixed, e.g., $a=2$ In one example Ex 7-1-0-1C, y is configured jointly with at least one higher-layer parameter. At least one of the following is used.
- y is configured jointly with higher layer parameter p $(p, y)=\{(1/4, 1/2), (1/2, 3/4)\}$
- y is configured jointly with higher layer parameter (p, $v_0$). At least one of the following is used.
  - $(p, v_0, y)=\{(1/4, 1/4, 1/2), (1/2, 1/4, 3/2)\}$.
  - $(p, v_0, y)=\{(1/4, 1/8, 1/2), (1/4, 1/4, 1/2), (1/2, 1/4, 3/4)\}$.
  - $(p, v_0, y)=\{(1/4, 1/8, 1/2), (1/2, 1/4, 3/4)\}$.

$(p, v_0, y) = \{(\frac{1}{4}, \frac{1}{8}, \frac{1}{2}), (\frac{1}{4}, \frac{1}{4}, \frac{1}{2}), (\frac{1}{2}, \frac{1}{4}, \frac{3}{4}), (\frac{1}{2}, \frac{1}{8}, \frac{3}{4})\}$.

In one example Ex 7-1-0-2: y is reported in UCI part 1

In one example Ex 7-1-0-2A: a 1-bit indication is used to indicate one of the two supported values $\{y_1, y_2\}$. At least one of the following is used.

The two supported values are fixed. At least one of the following is used.
  $\{y_1, y_2\}$ is independent of p value, e.g., $\{y_1, y_2\}=\{\frac{2}{3}, \frac{3}{4}\}$ or $\{\frac{5}{8}, \frac{3}{4}\}$ or $\{\frac{1}{2}, \frac{3}{4}\}$
  $\{y_1, y_2\}$ depends on p value, e.g., if $p=\frac{1}{4}$, $\{y_1, y_2\}=\{\frac{1}{2}, \frac{3}{4}\}$ and if $p=\frac{1}{2}$, $\{y_1, y_2\}=\{\frac{2}{3}, \frac{3}{4}\}$ or $\{\frac{5}{8}, \frac{3}{4}\}$.
The two supported values are higher-layer configured, e.g., from $\{\frac{1}{2}, \frac{5}{8}, \frac{2}{3}, \frac{3}{4}, 1\}$.

In one alternative Alt 7-10, $N'_3 = y(M+N_3)$ or $\lceil y(M+N_3) \rceil$ or $\lfloor y(M+N_3) \rfloor$, and y is determined according to at least one of the following examples.

In one example Ex 7-10-0: y is fixed. In one example, $y=\frac{1}{2}$.

In one example Ex 7-10-1: y is higher-layer configured from $\{y_1, y_2\}$, e.g., $\{y_1, y_2\}=\{\frac{1}{2}, \frac{3}{4}\}$ In one example Ex 7-10-2: y is reported in UCI part 1

In one example Ex 7-10-2A: a 1-bit indication is used to indicate one of the two supported values $\{y_1, y_2\}$. At least one of the following is used.

The two supported values are fixed, e.g., $\{y_1, y_2\}=\{\frac{1}{2}, \frac{3}{4}\}$
The two supported values are higher-layer configured, e.g., from $\{\frac{1}{2}, \frac{3}{4}, \frac{2}{3}\}$.

In one alternative Alt 7-10A, $N'_3$ is a fixed value satisfying $M < N'_3 < N_3$, e.g., $$\text{e.g., } N'_3 = \frac{M+N_3}{2} \text{ or } \left\lceil \frac{M+N_3}{2} \right\rceil \text{ or } \left\lfloor \frac{M+N_3}{2} \right\rfloor.$$

In embodiment 8, for RI≥1, the value $N'_3$ to determine the size of the FD intermediate basis set is determined according to at least one of the following alternatives.

In one alternative Alt 8-0: $N'_3$ is RI-common and layer-common, i.e., a single $N'_3$ is used for all RI values, and for all layers.

In one alternative Alt 8-1: $N'_3$ is RI-common and layer-specific, i.e., a separate $N'_3$ value is used for each layer value, and for a given layer value, the $N'_3$ value is common for all ranks or RI values.

In one alternative Alt 8-2: $N'_3$ is RI-specific and layer-common, i.e., a separate $N'_3$ is used for each rank or RI value, and for a given RI value, the $N'_3$ value is common for all layers. For example, $N'_3=N_3$ for rank 1-2 (i.e., FD basis selection is according to embodiment 0) and $N'_3$ is according to Alt 7-9 for rank 3-4 (i.e., FD basis selection is according to embodiment 1-5).

In one alternative Alt 8-3: $N'_3$ is RI-specific and layer-specific, i.e., a separate $N'_3$ value is used for each layer value and for each rank or RI value.

In embodiment 9, the size-$N'_3$ FD intermediate basis set is determined according to at least one of the following alternatives.

In one alternative Alt 9-0: the size-$N'_3$ FD intermediate basis set is adjacent and fully parameterized with the starting index $M_{initial}$ of the intermediate basis set (cf. embodiment 1). In one example, $M_{initial}$ is reported in UCI part 2.

In one alternative Alt 9-1: the size-$N'_3$ FD intermediate basis set is selected freely from N3 FD bases using a $$\left\lceil \log_2 \binom{N_3}{N'_3} \right\rceil \text{-bit}$$

combinatorial indicator, which for example, is reported in UCI part 2.

In one alternative Alt 9-2: the size-$N'_3$ FD intermediate basis set is selected from a number of higher-layer configured candidate subsets.

In one alternative Alt 9-3: the size-$N'_3$ FD intermediate basis set is selected freely from N3 FD bases using an $N_3$-bit bitmap, which for example, is reported in UCI part 2. The bitmap (bit sequence) comprise $N'_3$ ones "1" and remaining zeros "0", where the locations of ones correspond to the indices of the $N'_3$ intermediate FD bases. Alternatively, the bitmap (bit sequence) comprise $N'_3$ zeros "0" and remaining ones "1", where the locations of zeros correspond to the indices of the $N'_3$ intermediate FD bases.

In Embodiment 10, for RI≥1, the FD intermediate basis set is determined according to at least one of the following alternatives.

In one alternative Alt 10-0: the FD intermediate basis set is RI-common and layer-common, i.e., a single FD intermediate basis set is used for all RI values, and for all layers.

In one alternative Alt 10-1: the FD intermediate basis set is RI-common and layer-specific, i.e., a separate FD intermediate basis set is used for each layer value, and for a given layer value, the FD intermediate basis set is common for all ranks or RI values.

In one alternative Alt 10-2: the FD intermediate basis set is RI-specific and layer-common, i.e., a separate FD intermediate basis set is used for each rank or RI value, and for a given RI value, the FD intermediate basis set is common for all layers.

In one alternative Alt 10-3: the FD intermediate basis set is RI-specific and layer-specific, i.e., a separate FD intermediate basis set is used for each layer value and for each rank or RI value.

In embodiment 11, each PMI value, indicating the precoder or precoding matrix according the framework (5), corresponds to the codebook indices $i_1$ and $i_2$ where $$i_1 = \begin{cases} [i_{1,1} \ i_{1,2} \ i_{1,5} \ i_{1,6,1} \ i_{1,7,1} \ i_{1,8,1}] & v=1 \\ \begin{bmatrix} i_{1,1} \ i_{1,2} \ i_{1,5} \ i_{1,6,1} \ i_{1,7,1} \ i_{1,8,1} \\ i_{1,6,2} \ i_{1,7,2} \ i_{1,8,2} \end{bmatrix} & v=2 \\ \begin{bmatrix} i_{1,1} \ i_{1,2} \ i_{1,5} \ i_{1,6,1} \ i_{1,7,1} \ i_{1,8,1} \\ i_{1,6,2} \ i_{1,7,2} \ i_{1,8,2} \\ i_{1,6,3} \ i_{1,7,3} \ i_{1,8,3} \end{bmatrix} & v=3 \\ \begin{bmatrix} i_{1,1} \ i_{1,2} \ i_{1,5} \ i_{1,6,1} \ i_{1,7,1} \ i_{1,8,1} \\ i_{1,6,2} \ i_{1,7,2} \ i_{1,8,2} \\ i_{1,6,3} \ i_{1,7,3} \ i_{1,8,3} \\ i_{1,6,4} \ i_{1,7,4} \ i_{1,8,4} \end{bmatrix} & v=4 \end{cases}$$

$$i_2 = \begin{cases} [i_{2,3,1} \ i_{2,4,1} \ i_{2,5,1}] & v=1 \\ [i_{2,3,1} \ i_{2,4,1} \ i_{2,5,1} \ i_{2,3,2} \ i_{2,4,2} \ i_{2,5,2}] & v=2 \\ \begin{bmatrix} i_{2,3,1} \ i_{2,4,1} \ i_{2,5,1} \ i_{2,3,2} \ i_{2,4,2} \ i_{2,5,2} \\ i_{2,3,3} \ i_{2,4,3} \ i_{2,5,3} \end{bmatrix} & v=3 \\ \begin{bmatrix} i_{2,3,1} \ i_{2,4,1} \ i_{2,5,1} \ i_{2,3,2} \ i_{2,4,2} \ i_{2,5,2} \\ i_{2,3,3} \ i_{2,4,3} \ i_{2,5,3} \\ i_{2,3,4} \ i_{2,4,4} \ i_{2,5,4} \end{bmatrix} & v=4 \end{cases}$$

where
- $i_{1,1}$ are the rotation factors for the SD basis (same as in Rel. 15 Type II CSI codebook)
- $i_{1,2}$ is the SD basis indicator (same as in Rel. 15 Type II CSI codebook)
- $i_{1,5}$ is the $M_{initial}$ indicator when $N_3>19$, indicating the intermediate FD basis set InS comprising 2M FD basis vectors
- $i_{1,6,l}$ is the FD basis indicator for layer l, indicating M FD basis vectors
- $i_{1,7,l}$ is the bitmap for layer l, indicating the location of non-zero (NZ) coefficients
- $i_{1,8,l}$ is the strongest coefficient indicator (SCI) for layer l, indicating location of the strongest coefficient=1
- $i_{2,3,l}$ are the reference amplitudes (p) for layer l, indicating the reference amplitude coefficient for the weaker polarization
- $i_{2,4,l}$ is the matrix of the differential amplitude values $(p_{l,i,m}^{(2)})$ for layer l
- $i_{2,5,l}$ is the matrix of the phase values $(\varphi_{l,i,m})$ for layer l In embodiment 12, a UE is configured to report the FD basis vectors for l=1, 2, . . . , v, where v is the rank value (or number of layers) indicated by RI, according to embodiment 6, Alt 6-0 with x=19 of this disclosure, i.e., If $N_3 \leq 19$, the FD basis vectors are reported according to (A), i.e., without using any FD intermediate basis set InS (cf. embodiment 0), and If $N_3 > 19$, the FD basis vectors are reported according to (B), i.e., using an FD intermediate basis set InS (cf. embodiment 1).

The size of the InS is according to Alt 7-9-0, i.e., $N'_3 = \lceil y \times M \rceil$ or $y \times M$ and y is fixed to y=2. The value $N'_3$ is according to Alt 8-2, i.e., layer-common but depends on the M value for different ranks. For example, let $$M = \left\lceil p\frac{N_3}{R} \right\rceil,$$

where R is higher layer configured, then $p=y_0$ value for rank 1-2 and $p=v_0$ value for rank 3-4 can be different, e.g. $(y_0, v_0) \in \{(1/4, 1/8), (1/4, 1/4), (1/2, 1/4)\}$. The size-$N'_3$ FD intermediate basis set InS is determined according to Alt 9-0 (cf. embodiment 1), i.e., InS is fully parameterized with the starting index $M_{initial}$ of the intermediate basis set (cf. embodiment 1). The indices of the FD basis vectors in InS is given by $\mod(M_{initial}+n, N_3)$, n=0, 1, . . . , $N_3-1$, InS is RI-common and layer-common (cf. Alt 10-0), and $M_{initial}$ is reported via a $\lceil \log_2 X \rceil$-bit indicator (cf. Alt 1C-0) where $X=N_3$ or $N'_3$. For each layer $l \in \{0, 1, \ldots, v-1\}$, one of the FD basis vectors is always fixed, hence not reported by the UE. In one example, this fixed FD basis vector is FD basis vector with index=0. The remaining $M_l-1$ FD basis vectors are selected/reported by the UE as follows.

If $N_3 \leq 19$: the remaining $M_l-1$ FD basis vectors are selected/reported according to Alt 0-1, i.e., the FD basis subset selection indicator $i_{FD,l}$ is a $$\left\lceil \log_2 \binom{N_3-1}{M_l-1} \right\rceil\text{-bit}$$

indicator, where $$i_{FD,l} \in \left\{0, 1, \ldots, \binom{N_3-1}{M_l-1}-1\right\}.$$

If $N_3 > 19$: the remaining $M_l-1$ FD basis vectors are selected/reported according to Alt 1-1, i.e., the FD basis subset selection indicator $i_{FD,l}$ is a $$\left\lceil \log_2 \binom{N'_3-1}{M_l-1} \right\rceil\text{-bit}$$

indicator, where $$i_{FD,l} \in \left\{0, 1, \ldots, \binom{N'_3-1}{M_l-1}-1\right\}.$$

The above description of FD basis vector selection/indication/reporting is equivalent to the following more detailed description.

The M FD basis vectors combined by the codebook are identified by the indices, $n_{3,l}$ (l=1, . . . , v), and $M_{initial}$ (for $N_3>19$), where $$n_{3,l} = [n_{3,l}^{(0)}, \ldots, n_{3,l}^{(M-1)}],$$

$$n_{3,l}^{(m)} \in \{0,1, \ldots, N_3-1\},$$

$$M_{initial} \in \{-2M+1, -2M+2, \ldots, 0\},$$

which are indicated (reported) by means of the indices $i_{1,5}$ indicating $M_{initial}$ (for $N_3>19$) and $i_{1,6,l}$ indicating $n_{3,l}$ (l=1, . . . , v), where $$i_{1,5} \in \{0, 1, 2M-1\},$$

$$i_{1,6,l} \in \begin{cases} \left\{0, 1, \ldots, \binom{N_3-1}{M-1}-1\right\} & N_3 \leq 19 \\ \left\{0, 1, \ldots, \binom{N'_3-1}{M-1}-1\right\} & N_3 > 19 \end{cases},$$

$$N'_3 = 2M.$$

For $N_3>19$, $M_{initial}$ is identified by $i_{1,5}$ as follows $$M_{initial} = \begin{cases} i_{1,5} & i_{1,5} = 0 \\ i_{1,5} - 2M & i_{1,5} > 0 \end{cases}.$$

As described in U.S. patent application Ser. No. 16/045,543, filed Jul. 25, 2018 and entitled "Method and Apparatus for Beam Selection for CSI Reporting in Advanced Wireless Communication Systems," which is incorporated herein by reference in its entirety, the indices of FD basis vectors can be reported jointly using a single indicator. In particular, for all values of $N_3$, $n_{3,l}^{(0)}=0$ for l=1, . . . , v, indicating that the FD basis vector with index=0 is always included. The remaining M−1 nonzero elements of $n_{3,l}$, identified by $n_{3,l}^{(1)}, \ldots, n_{3,l}^{(M-1)}$, are found from $i_{1,6,l}$ (l=1, . . . , v), for $N_3 \leq 19$, and from $i_{1,6,l}$ (l=1, ..., υ) and $M_{initial}$, for $N_3 > 19$, using C(x, y) as defined in 5.2.2.2.3 of [REF8] and the algorithm:

```
s_0 = 0
for m = 1, ..., M - 1
    Find the largest x* ∈ {M - 1 - m, ..., N_3 - 1 - m} in Table B-1
    such that
        i_{1,6,l} - S_{m-1} ≥ C(x*, M - m)
        e_m = C(x*, M - m)
        s_m = s_{m-1} + e_m
        if N_3 ≤ 19
            n_{3,l}^{(m)} = N_3 - 1 - x*
        else
            n_l^{(m)} = 2M - 1 - x*
            if n_l^{(m)} ≤ M_{initial} + 2M - 1
                n_{3,l}^{(m)} = n_l^{(m)}
            else
                n_{3,l}^{(m)} = n_l^{(m)} + (N_3 - 2M)
            end if
        end if
end if
```

TABLE B-1

Combinatorial coefficients C(x, y)

| x | y=1 | 2 | 3 | 4 | 5 | 6 | 7 | 8 | 9 |
|---|-----|---|---|---|---|---|---|---|---|
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 2 | 1 | 0 | 0 | 0 | 0 | 0 | 0 | 0 |
| 3 | 3 | 3 | 1 | 0 | 0 | 0 | 0 | 0 | 0 |
| 4 | 4 | 6 | 4 | 1 | 0 | 0 | 0 | 0 | 0 |
| 5 | 5 | 10 | 10 | 5 | 1 | 0 | 0 | 0 | 0 |
| 6 | 6 | 15 | 20 | 15 | 6 | 1 | 0 | 0 | 0 |
| 7 | 7 | 21 | 35 | 35 | 21 | 7 | 1 | 0 | 0 |
| 8 | 8 | 28 | 56 | 70 | 56 | 28 | 8 | 1 | 0 |
| 9 | 9 | 36 | 84 | 126 | 126 | 84 | 36 | 9 | 1 |
| 10 | 10 | 45 | 120 | 210 | 252 | 210 | 120 | 45 | 10 |
| 11 | 11 | 55 | 165 | 330 | 462 | 462 | 330 | 165 | 55 |
| 12 | 12 | 66 | 220 | 495 | 792 | 924 | 792 | 495 | 220 |
| 13 | 13 | 78 | 286 | 715 | 1287 | 1716 | 1716 | 1287 | 715 |
| 14 | 14 | 91 | 364 | 1001 | 2002 | 4004 | 3432 | 3003 | 2002 |
| 15 | 15 | 105 | 455 | 1365 | 3003 | 5005 | 6435 | 6435 | 5005 |
| 16 | 16 | 120 | 560 | 1820 | 4368 | 8008 | 11440 | 12870 | 11440 |
| 17 | 17 | 136 | 680 | 2380 | 6188 | 12376 | 19448 | 24310 | 24310 |
| 18 | 18 | 153 | 816 | 3060 | 8568 | 18564 | 31824 | 43758 | 48620 |

When $n_{3,l}$ and $M_{initial}$ are known, $i_{1,5}$ and $i_{1,6,l}$ (l=1, ..., υ) are found as follows:

If $N_3 \leq 19$, $i_{1,5} = 0$ and is not reported. $i_{1,6,l} = \sum_{m=1}^{M-1} C(N_3 - 1 - n_{3,l}^{(m)}, M-m)$, where C(x, y) is given in Table B-1 and where the indices m=1, ..., M−1 are assigned such that $n_{3,l}^{(m)}$ increases as m increases.

If $N_3 \geq 19$, $M_{initial}$ is indicated by $i_{1,5}$, which is reported and given by $$i_{1,5} = \begin{cases} M_{initial} & M_{initial} = 0 \\ M_{initial} + 2M & M_{initial} < 0 \end{cases}.$$

Only the nonzero indices $n_{3,l}^{(m)} \in IntS$, where $IntS = \{(M_{initial} + i) \bmod N_3, i=0, 1, ..., 2M-1\}$, are reported, where the indices m=1, ..., M−1 are assigned such that $n_{3,l}^{(m)}$ increases as m increases. Let $$n_l^{(m)} = \begin{cases} n_{3,l}^{(m)} & n_{3,l}^{(m)} \leq M_{initial} + 2M - 1 \\ n_{3,l}^{(m)} - (N_3 - 2M) & n_{3,l}^{(m)} > M_{initial} + N_3 - 1 \end{cases},$$

then $i_{1,6,l} = \sum_{m=1}^{M-1} C(2M - 1 - n_l^{(m)}, M-m)$, where C(x, y) is given in Table B-1.

Figure 14:
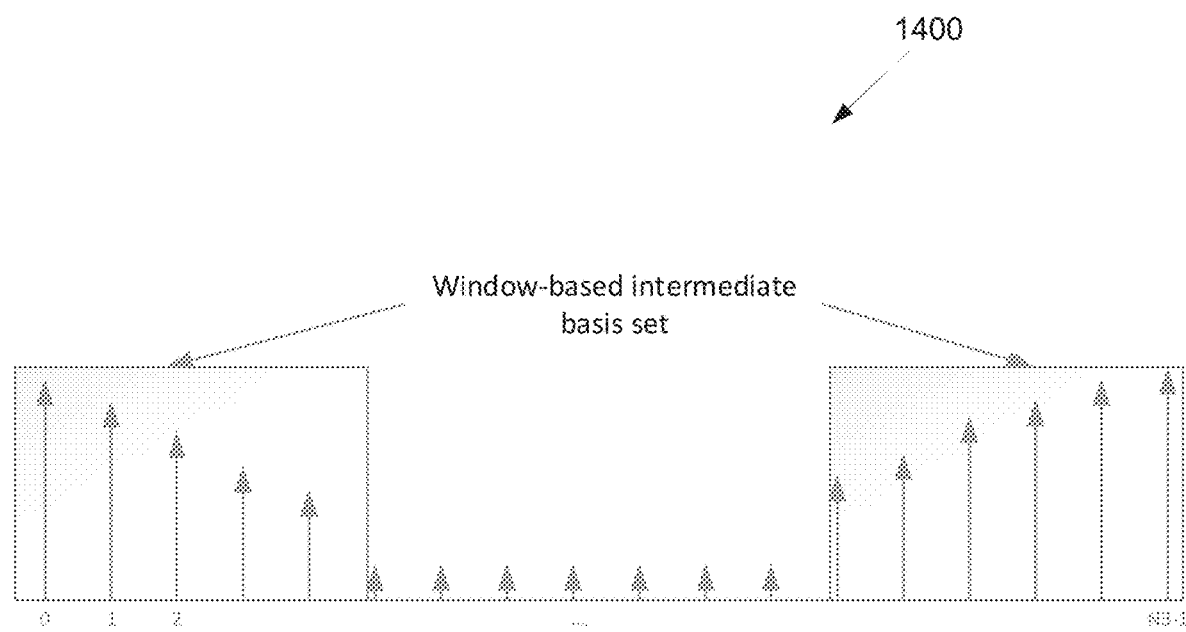
FIG. 14 illustrates an example window-based intermediate basis set according to embodiments of the present disclosure.

FIG. 14 illustrates a window-based intermediate basis set 1400 according to embodiments of the present disclosure. The embodiment of the window-based intermediate basis set 1400 illustrated in FIG. 14 is for illustration only. FIG. 14 does not limit the scope of this disclosure to any particular implementation of the window-based intermediate basis set 1400.

In embodiment 13, a two-step FD basis subset selection method is used. The first step uses an intermediate FD basis set comprising $N'_3$ basis vectors (where $N'_3 \leq N_3$). The value $N_3$ is either reported by the UE (e.g., via part 1 of a two-part UCI) or fixed or higher-layer configured. The intermediate FD basis set is a common pool of FD basis vectors for all layers, and is reported via part 2 of a two-part UCI. The indices of the FD basis vectors in this intermediate set is given by $\bmod(M_{initial} + n, N_3)$, n=0, 1, ..., $N'_3 - 1$, which corresponds to a window-based intermediate basis set 1400 as illustrated in FIG. 14 comprising $N'_3$ adjacent FD indices with modulo-shift by $N_3$, where $M_{initial}$ is the starting index of the intermediate FD basis set.

In the second step, for each layer l ∈ {0, 1, ..., v−1}, the set of $M_l$ FD basis vectors are reported by the UE from the intermediate FD basis set according to at least one of the following alternatives.

In one alternative Alt 13-0: the FD basis subset selection indicator $i_{FD,l}$ is a $$\left\lceil \log_2 \binom{N'_3}{M_l} \right\rceil\text{-bit}$$

indicator, where $$i_{FD,l} \in \left\{0, 1, \ldots, \binom{N_3'}{M_l} - 1\right\}.$$

In one alternative Alt 13-1: the FD basis subset selection indicator $i_{FD,l}$ is a $$\left\lceil \log_2\binom{N_3'}{M_l - 1} \right\rceil \text{ or } \left\lceil \log_2\binom{N_3' - 1}{M_l - 1} \right\rceil \text{-bit}$$

indicator, where $$i_{FD,l} \in \left\{0, 1, \ldots, \binom{N_3'}{M_l - 1}\right\} - 1 \text{ or } \binom{N_3^l - 1}{M_l - 1} - 1 \right\}.$$

In this alternative, one of the FD basis vectors is always fixed, and hence not reported by the UE. In one example, this fixed FD basis vector is FD basis vector with index=0.

In one alternative Alt 13-2: the FD basis subset selection indicator $i_{FD,l}$ is a size-$N'_3$ bitmap, where $i_{FD,l} = b_0 b_1 \ldots b_{N'_3}$, and the set of $M_l$ FD basis vectors are indicated by reporting $M_l$ of these bits $b_i$'s to one and the rest to zero. Alternatively, the set of $M_l$ FD basis vectors are indicated by reporting $M_l$ of these bits $b_i$'s to zero and the rest to one.

In embodiment 13A, the starting index ($M_{initial}$) of the intermediate FD basis set is indicated (reported) by the UE (e.g., via part 2 UCI). In one example, this indication is via a $\lceil \log_2 N_3 \rceil$-bit indicator.

In embodiment 13B, the starting index ($M_{initial}$) of the intermediate FD basis set is fixed, hence not reported by the UE. In one example, $M_{initial}=0$. At least one of the following alternatives is used to determine (obtain) the intermediate basis set.

In one alternative Alt13B-1, the intermediate basis set (denoted as InS) is determined based on layer-specific InS(l) of size $N'_3$ as follows.

For each layer $l \in \{0, 1, \ldots, RI-1\}$, the UE determines a window-based InS(l) (comprising $N'_3$ components out of $N_3$ FD basis vectors) with the starting index $M_{initial,l}$.
In one example, this determination is based on max power. For example,
The UE calculates the power $p_n$ of each FD component $n \in \{0, 1, \ldots, N_3-1\}$ using the DL channel measurements.
The UE then calculates sum power of $S_n = \Sigma_{k=0}^{N'_3-1} p_{n+k}$ for each $n \in \{0, 1, \ldots, N_3-1\}$.
The starting index $M_{initial,l} = n^*$ where $n^*$ is the index n such that $$S_{n^*} = \max_{n \in \{0, \ldots, N_3-1\}} S_n.$$

In one example, the UE is restricted to determine the InS(l) for layers such that $M_{initial,l}$ for all layers are restricted to be within a value $\Delta$. In one example, $$M_{initial,l} \in \left\{N_3 - \frac{N'_3}{2} + \Delta\right\}$$

where $\Delta$ is fixed, e.g. $\Delta = \{-2, -1, 0, 1, 2\}$.
InS' with $M'_{initial}$ as starting index is then determined based on $\{M_{initial,0}, M_{initial,1}, \ldots, M_{initial,RI-1}\}$
In one example, $M'_{initial} = \min\{M_{initial,0}, M_{initial,1}, \ldots, M_{initial,RI-1}\}$
In one example, $M'_{initial} = M_{initial,Z}$ where Z is fixed, e.g. Z=0 or RI-1
In one example, $M'_{initial} = M_{initial,Z}$ where Z is configured from $\{0, \ldots, RI-1\}$.
In one example, $M'_{initial} = M_{initial,Z}$ where Z is reported by the UE, e.g. from $\{0, \ldots, RI-1\}$.
Let $\{k_n\}_{n=0}^{N'_3-1}$ be the FD indices comprising InS with $M'_{initial}$ as the starting index.
Finally, InS with $M_{initial}=0$ is determined by modulo cyclic shift (CS) of InS' where the amount of CS $x = M'_{initial}$. The modulo-shifted FD indices is given by $(k'_n = \mod\{k_n - x, N_3\}_{n=0}^{N'_3-1}$.

In one alternative Alt13B-2, the intermediate basis set (denoted as InS) is determined based on layer-specific InS(l) of size $M_l$ as follows.

For each layer $l \in \{0, 1, \ldots, RI-1\}$, the UE determines a window-based InS(l) (comprising $M_l$ components out of $N_3$ FD basis vectors) with the starting index $M_{initial,l}$.
In one example, this determination is based on max power. For example,
The UE calculates the power $p_n$ of each FD component $n \in \{0, 1, \ldots, N_3-1\}$ using the DL channel measurements.
The UE then calculates sum power of $S_n = \Sigma_{k=0}^{M_l-1} p_{n+k}$ for each $n \in \{0, 1, \ldots, N_3-1\}$.
The starting index $M_{initial,l} = n^*$ where $n^*$ is the index n such that $$S_{n^*} = \max_{n \in \{0, \ldots, N_3-1\}} S_n.$$

In one example, the UE is restricted to determine the InS(l) for layers such that $M_{initial,l}$ for all layers are restricted to be within a value $\Delta$. In one example, $$M_{initial,l} \in \left\{N_3 - \frac{N_3^l}{2} + \Delta\right\}$$

where $\Delta$ is fixed, e.g. $\Delta = \{-2, -1, 0, 1, 2\}$.
InS' with $M'_{initial}$ as starting index is then determined based on $\{M_{initial,0}, M_{initial,1}, \ldots, M_{initial,RI-1}\}$
In one example, $M'_{initial} = \min\{M_{initial,0}, M_{initial,1}, \ldots, M_{initial,RI-1}\}$
Let $\{k_n\}_{n=0}^{N'_3-1}$ be the FD indices comprising InS with $M'_{initial}$ as starting index.
Finally, InS with $M_{initial}=0$ is determined by modulo cyclic shift (CS) of InS' where the amount of CS $x = M'_{initial}$. The modulo-shifted FD indices is given by $(k'_n = \mod\{k_n - x, N_3\}_{n=0}^{N'_3-1}$.

In one alternative Alt13B-3, the intermediate basis set (denoted as InS) is determined as follows.

For each layer $l \in \{0, 1, \ldots, RI-1\}$, the UE determines the LC coefficients $\{c_{l,i,m}\}$ for all $i \in \{0, 1, \ldots, 2L-1\}$ and $m \in \{0, 1, \ldots, N_3-1\}$.
For each FD index $m \in \{0, 1, \ldots, N_3-1\}$, the UE calculates a metric value $p_m$ using the LC coefficients $\{c_{l,i,m}\}$. In one example, the metric is (sum) power $p_m = \Sigma_{l=0}^{RI-1} \Sigma_{i=0}^{2L-1} a_{l,i,m}^2$ where $a_{l,i,m} = |c_{l,i,m}|$ is the amplitude of the coefficient $c_{l,i,m}$. Note that the sum is over all layers and all spatial domain (SD) basis (or beams).

The UE calculates sum power for all possible window-based intermediate basis sets, i.e., the UE computes $S_m = \sum_{n=0}^{N'_3-1} p_{m+n}$ for each $m \in \{0, 1, \ldots, N_3-1\}$.

The UE then determines InS' with starting index $M'_{initial} = m^*$, where $m^*$ is the index $m$ such that $$S_{m^*} = \max_{m \in \{0,\ldots,N_3-1\}} S_m.$$

Let $\{k_n\}_{n=0}^{N'_3-1}$ be the FD indices comprising InS' with $M_{initial} = m^*$ as starting index.

Finally, InS with $M_{initial} = 0$ is determined by modulo cyclic shift (CS) of InS' where the amount of CS $x = M'_{initial}$. The modulo-shifted FD indices is given by $\{k'_n = \text{mod}\{k_n - x, N_3\}\}_{n=0}^{N'_3-1}$.

In a variation, when $N'_3$ value is not sufficient to capture all "dominant" FD indices for all layers (which correspond to FD indices with large power), then UE can set $N'_3 = N_3$ and select all FD components $\{0, 1, \ldots, N_3-1\}$ in InS. Note that this selection is equivalent to one-step FD basis selection. The UE can indicate (report) this selection via a 1-bit indication I in UCI part 1.

In one example, I=0 indicates $N'_3 = N_3$ or one-step FD basis selection, and I=1 indicates $N'_3 < N_3$ or two-step FD basis selection.

In another example, I=1 indicates $N'_3 = N_3$ or one-step FD basis selection, and I=0 indicates $N'_3 < N_3$ or two-step FD basis selection.

In one alternative Alt13B-4, the intermediate basis set (denoted as InS) is determined as follows.

For each layer $l \in \{0, 1, \ldots, RI-1\}$, the UE determines the indices $\{k_{m_l}\}_{m_l=0}^{M_l-1}$ indicating the FD basis $W_f = [w_{k_0}, w_{k_1}, \ldots w_{k_{M-1}}]$ and the LC coefficients $\{c_{l,i,m}\}$, where $M_l < N_3$ is the number of FD basis vectors selected for layer $l$.

For each FD index $m \in \{0, 1, \ldots, N_3-1\}$, the UE calculates a metric value $p_m$ using the LC coefficients $\{c_{l,i,m}\}$. In one example, the metric is (sum) power $p_m = \sum_{l=0}^{RI-1} \sum_{i=0}^{2L-1} a_{l,i,m}^2$ where $a_{l,i,m} = |c_{l,i,m}|$ is the amplitude of the coefficient $c_{l,i,m}$, and the UE sets $c_{l,i,m} = 0$ for FD indices which don't belong to the set of indices $\{k_{m_l}\}_{m_l=0}^{M_l-1}$. Note that the sum is over all layers and all spatial domain (SD) basis (or beams).

The UE calculates sum power for all possible window-based intermediate basis sets, i.e., the UE computes $S_m = \sum_{n=0}^{N'_3-1} p_m + n$ for each $m \in \{0, 1, \ldots, N_3-1\}$.

The UE then determines InS' with starting index $M'_{initial} = m^*$, where $m^*$ is the index $m$ such that $$S_{m^*} = \max_{m \in \{0,\ldots,N_3-1\}} S_m.$$

Let $\{k_n\}_{n=0}^{n'_3-1}$ be the FD indices comprising InS' with $M'_{initial} = m^*$ as starting index.

Finally, InS with $M_{initial} = 0$ is determined by modulo cyclic shift (CS) of InS' where the amount of CS $x = M'_{initial}$. The modulo-shifted FD indices is given by $\{k'_n = \text{mod}\{k_n - x, N_3\}\}_{n=0}^{N'_3-1}$.

In a variation, when N3 value is not sufficient to capture all "dominant" FD indices for all layers (which correspond to FD indices with large power), then UE can set $N3 = N_3$ and select all FD components $\{0, 1, \ldots, N_3-1\}$ in InS. Note that this selection is equivalent to one-step FD basis selection. The UE can indicate (report) this selection via a 1-bit indication I in UCI part 1.

In one example, I=0 indicates $N'_3 = N_3$ or one-step FD basis selection, and I=1 indicates $N'_3 < N_3$ or two-step FD basis selection.

In another example, I=1 indicates $N'_3 = N_3$ or one-step FD basis selection, and I=0 indicates $N'_3 < N_3$ or two-step FD basis selection.

Figure 15:
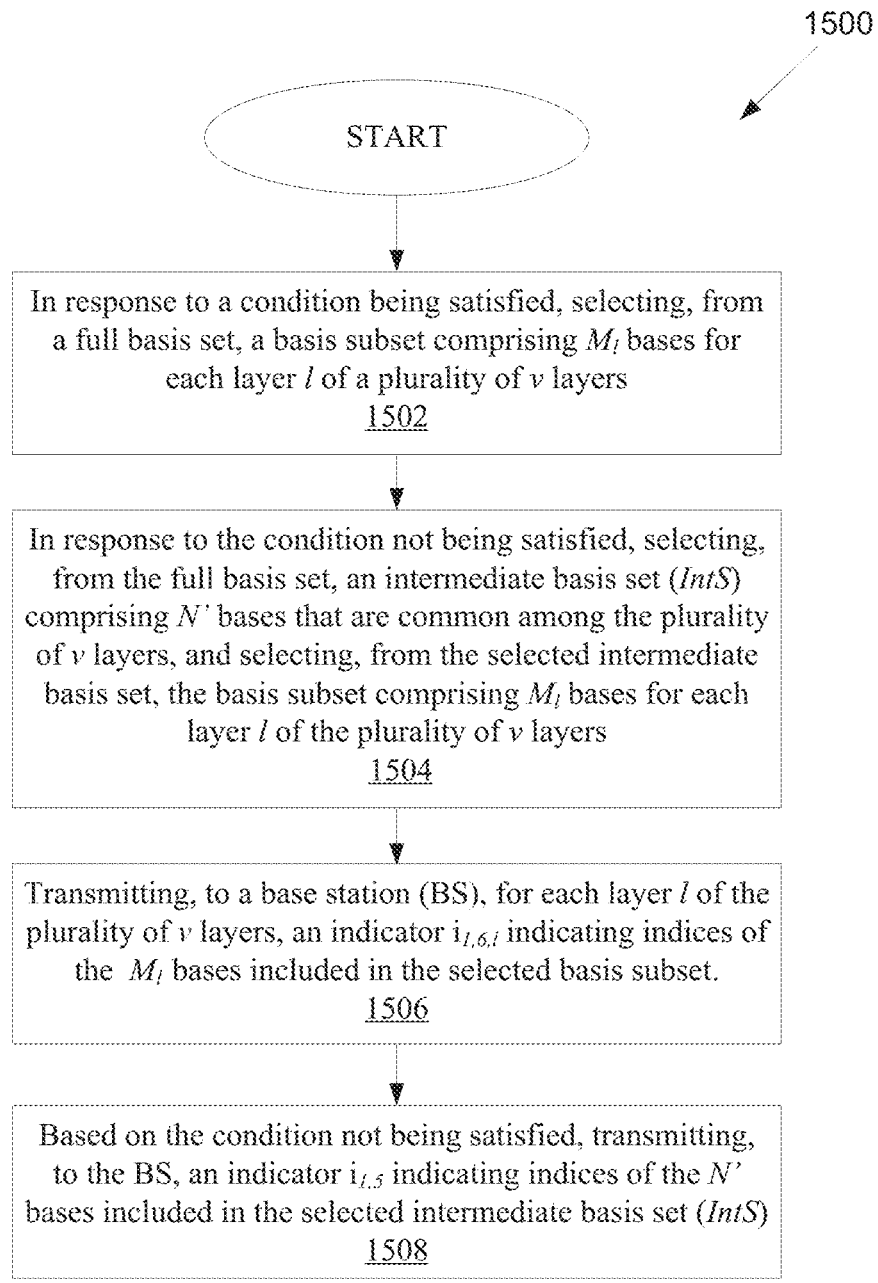
FIG. 15 illustrates a flow chart of a method for transmitting an UL transmission including CSI reporting, as may be performed by a UE according to embodiments of the present disclosure.

FIG. 15 illustrates a flow chart of a method 1500 for operating a user equipment (UE), as may be performed by a UE such as UE 116, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the UE (e.g., 111-116 as illustrated in FIG. 1), in response to a condition being satisfied, selects, from a full basis set, a basis subset comprising $M_l$ bases for each layer l of a plurality of v layers.

In step 1504, the UE, in response to the condition not being satisfied, selects, from the full basis set, an intermediate basis set (IntS) comprising N' bases that are common among the plurality of v layers, and selecting, from the selected intermediate basis set, the basis subset comprising $M_l$ bases for each layer l of the plurality of v layers.

In step 1506, the UE transmits, to a base station (BS), for each layer l of the plurality of v layers, an indicator $i_{1,6,l}$ indicating indices of the $M_l$ bases included in the selected basis subset.

In step 1508, the UE, based on the condition not being satisfied, transmits, to the BS, an indicator $i_{1,5}$ indicating indices of the N' bases included in the selected intermediate basis set (IntS).

The full basis set comprises $N_3$ bases, wherein $N_3$, N', and $M_l$ are positive integers; $M_l < N_3$ when the condition is satisfied and $M_l < N' < N_3$ when the condition is not satisfied; $l \in \{1, \ldots, v\}$; and $v \geq 1$ is a rank value.

In one embodiment, when a value of $N_3$ is less than or equal to nineteen ($N_3 \leq 19$), the condition is satisfied; and when the value of $N_3$ is greater than nineteen ($N_3 > 19$), the condition is not satisfied.

In one embodiment, one of the indices of the $M_l$ bases included in the selected basis subset is fixed to zero for each layer l of the plurality of v layers; the indicator $i_{1,6,l}$ indicates the indices of the remaining $M_l - 1$ bases included in the selected basis subset for each layer l of the plurality of v layers, wherein a payload of the indicator $i_{1,6,l}$ is $$\left\lceil \log_2 \binom{N_3 - 1}{M_l - 1} \right\rceil \text{ bits}$$

when the condition is satisfied and $$\left\lceil \log_2 \binom{N' - 1}{M_l - 1} \right\rceil \text{ bits}$$

when the condition is not satisfied, and $\lceil \cdot \rceil$ is a ceiling function; and when the condition is not satisfied, the indicator $i_{1,5}$ indicates an initial basis index ($M_{initial}$) of the intermediate basis set (IntS), which is determined as IntS={ $(M_{initial}+i)$ mod $N_3$, i=0, 1, ..., N'-1}, where mod is a modulo function.

In one embodiment, the full basis set is a set of discrete Fourier transform (DFT) vectors:

$$w_n = \begin{bmatrix} 1 & e^{j\frac{2\pi n}{N_3}} & e^{2j\frac{2\pi n}{N_3}} & \ldots & e^{(N_3-1)j\frac{2\pi n}{N_3}} \end{bmatrix},$$

where n=0, 1, ..., $N_3$–1; and a value of N' is such that N'=2$M_l$.

Figure 16:
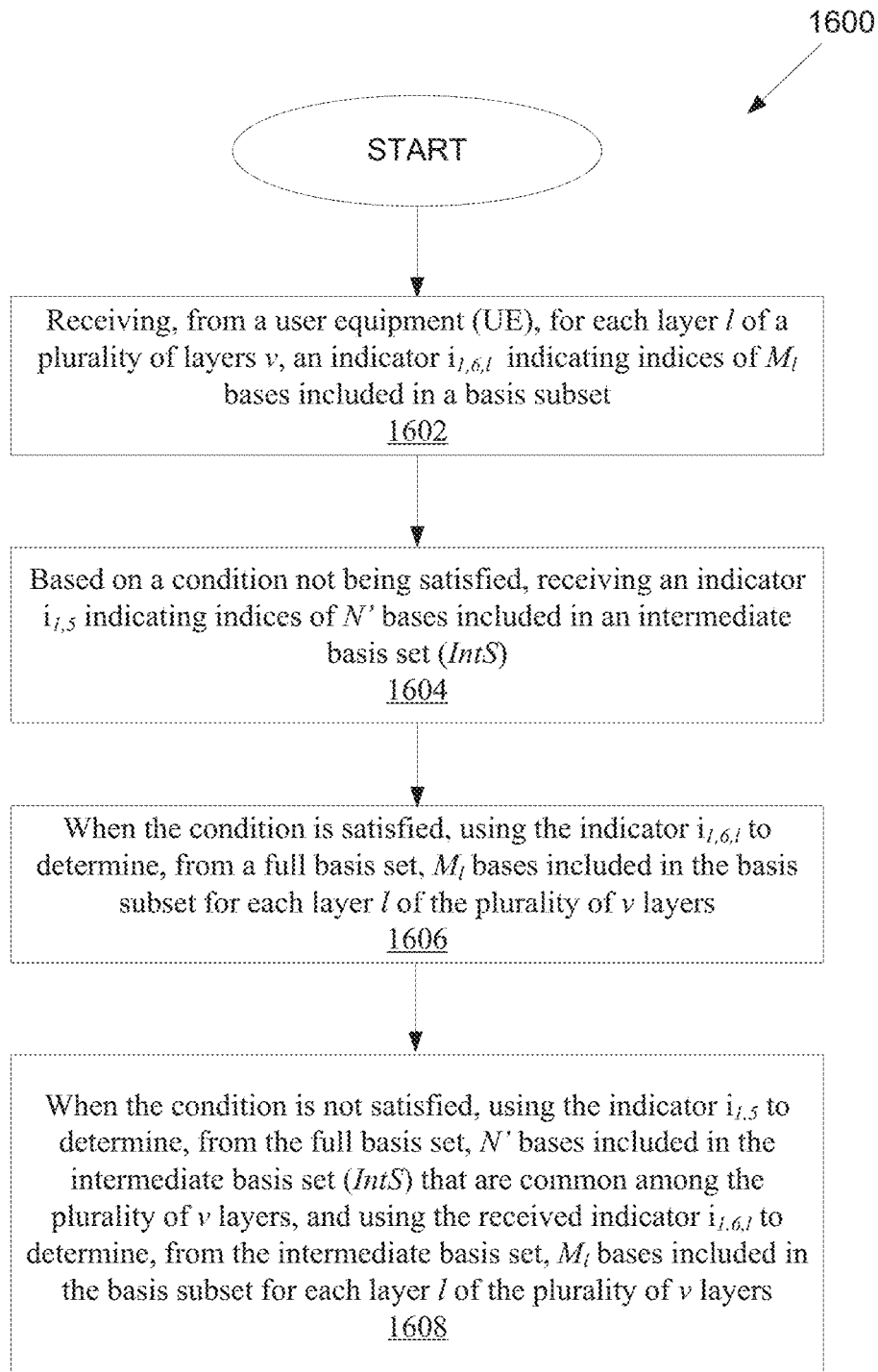
FIG. 16 illustrates a flow chart of another method for receiving an UL transmission including CSI reporting, as may be performed by a BS, according to embodiments of the present disclosure.

FIG. 16 illustrates a flow chart of another method 1600, as may be performed by a base station (BS) such as BS 102, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the BS (e.g., 101-103 as illustrated in FIG. 1), receives, from a user equipment (UE), for each layer l of a plurality of v layers, an indicator $i_{1,6,l}$ indicating indices of $M_l$ bases included in a basis subset.

In step 1604, the BS, based on a condition not being satisfied, receives an indicator $i_{1,5}$ indicating indices of N' bases included in an intermediate basis set (IntS).

In step 1606, the BS, when the condition is satisfied, uses the indicator $i_{1,6,l}$ to determine, from a full basis set, $M_l$ bases included in the basis subset for each layer l of the plurality of v layers.

In step 1608, the BS, when the condition is not satisfied, uses the indicator $i_{1,5}$ to determine, from the full basis set, N' bases included in the intermediate basis set (IntS) that are common among the plurality of v layers, and uses the received indicator $i_{1,6,l}$ to determine, from the intermediate basis set, $M_l$ bases included in the basis subset for each layer l of the plurality of v layers.

The full basis set comprises $N_3$ bases, and wherein $N_3$, N', and $M_l$ are positive integers; $M_l < N_3$ when the condition is satisfied and $M_l < N' < N_3$ when the condition is not satisfied; l∈{1, ..., v}; and v≥1 is a rank value.

In one embodiment, when a value of $N_3$ is less than or equal to nineteen ($N_3 \leq 19$), the condition is satisfied; and when the value of $N_3$ is greater than nineteen ($N_3 > 19$), the condition is not satisfied.

In one embodiment, one of the indices of the $M_l$ bases included in the basis subset is fixed to zero for each layer l of the plurality of v layers.

In one embodiment, the indicator $i_{1,6,l}$ indicates the indices of the remaining $M_l$–1 bases included in the basis subset for each layer l of the plurality of v layers, wherein a payload of the indicator $i_{1,6,l}$ is $$\left\lceil \log_2 \binom{N_3-1}{M_l-1} \right\rceil \text{ bits}$$

when the condition is satisfied and $$\left\lceil \log_2 \binom{N'-1}{M_l-1} \right\rceil \text{ bits}$$

when the condition is not satisfied, and $\lceil \cdot \rceil$ is a ceiling function.

In one embodiment, when the condition is not satisfied, the indicator $i_{1,5}$ indicates an initial basis index ($M_{initial}$) of the intermediate basis set (IntS), which is determined as IntS={$(M_{initial}+i)$ mod $N_3$, i=0, 1, ..., N'-1}, where mod is a modulo function.

In one embodiment, the transceiver is further configured to receive a channel state information (CSI) report from the UE; and the CSI report includes a pre-coding matrix indicator (PMI), the PMI including the indicator $i_{1,6,l}$ for each layer l of the plurality of v layers, and based on the condition not being satisfied, the indicator $i_{1,5}$.

In one embodiment, the full basis set comprises a set of discrete Fourier transform (DFT) vectors:

$$w_n = \begin{bmatrix} 1 & e^{j\frac{2\pi n}{N_3}} & e^{2j\frac{2\pi n}{N_3}} & \ldots & e^{(N_3-1)j\frac{2\pi n}{N_3}} \end{bmatrix},$$

where n=0, 1, ..., $N_3$–1.

In one embodiment, a value of N' is such that N'=2$M_l$.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), the UE comprising:
   a processor configured to:
   in response to a condition being satisfied, select, from a full basis set, a basis subset comprising $M_l$ bases for each layer l of a plurality of v layers; and
   in response to the condition not being satisfied, select, from the full basis set, an intermediate basis set (IntS) comprising N' bases that are common among the plurality of v layers, and select, from the selected intermediate basis set, the basis subset comprising $M_l$ bases for each layer l of the plurality of v layers; and
   a transceiver operably connected to the processor, the transceiver configured to:
   transmit, to a base station (BS), for each layer l of the plurality of v layers, an indicator $i_{1,6,l}$ indicating indices of the $M_l$ bases included in the selected basis subset; and
   based on the condition not being satisfied, transmit, to the BS, an indicator $i_{1,5}$ indicating indices of the N' bases included in the selected intermediate basis set (IntS);
   wherein the full basis set comprises $N_3$ bases, and wherein $N_3$, N', and $M_l$ are positive integers; $M_l < N_3$ when the condition is satisfied and $M_l < N' < N_3$ when the condition is not satisfied; l∈{1, ..., v}; and v≥1 is a rank value.

2. The UE of claim 1, wherein the processor is configured to determine that:
   when a value of $N_3$ is less than or equal to nineteen ($N_3 \leq 19$), the condition is satisfied; and
   when the value of $N_3$ is greater than nineteen ($N_3 > 19$), the condition is not satisfied.

3. The UE of claim 2, wherein one of the indices of the $M_l$ bases included in the selected basis subset is fixed to zero for each layer l of the plurality of v layers.

4. The UE of claim 3, wherein the indicator $i_{1,6,l}$ indicates the indices of the remaining $M_l$–1 bases included in the selected basis subset for each layer l of the plurality of v layers, wherein a payload of the indicator $i_{1,6,l}$ is $$\left\lceil \log_2 \binom{N_3 - 1}{M_l - 1} \right\rceil \text{ bits}$$

when the condition is satisfied and $$\left\lceil \log_2 \binom{N' - 1}{M_l - 1} \right\rceil \text{ bits}$$

when the condition is not satisfied, and $\lceil \ \rceil$ is a ceiling function.

5. The UE of claim 3, wherein when the condition is not satisfied, the indicator $i_{1,5}$ indicates an initial basis index ($M_{initial}$) of the intermediate basis set (IntS), which is determined as IntS={$(M_{initial}+i)$mod $N_3$, $i$=0,1, . . . ,$N'$–1}, where mod is a modulo function.

6. The UE of claim 1, wherein:
the processor is further configured to determine a channel state information (CSI) report; and
the transceiver is further configured to transmit the CSI report to the BS,
wherein the CSI report includes a pre-coding matrix indicator (PMI), the PMI including the indicator $i_{1,6,l}$ for each layer l of the plurality of v layers, and based on the condition not being satisfied, the indicator $i_{1,5}$.

7. The UE of claim 1, wherein the full basis set comprises a set of discrete Fourier transform (DFT) vectors:

$$w_n = \left[ 1 \ e^{j\frac{2\pi n}{N_3}} \ e^{2j\frac{2\pi n}{N_3}} \ \ldots \ e^{(N_3-1)j\frac{2\pi n}{N_3}} \right],$$

where n=0, 1, . . . , $N_3$–1.

8. The UE of claim 1, wherein the processor is configured to determine a value of N' such that N'=2$M_l$.

9. A base station (BS), the BS comprising:
a transceiver configured to receive, from a user equipment (UE), (i) for each layer l of a plurality of v layers, an indicator $i_{1,6,l}$ indicating indices of $M_l$ bases included in a basis subset and (ii) based on a condition not being satisfied, an indicator $i_{1,5}$ indicating indices of N' bases included in an intermediate basis set (IntS); and
a processor operably connected to the transceiver, the processor configured to:
when the condition is satisfied, use the indicator $i_{1,6,l}$ to determine, from a full basis set, $M_l$ bases included in the basis subset for each layer l of the plurality of v layers; and
when the condition is not satisfied, use the indicator $i_{1,5}$ to determine, from the full basis set, N' bases included in the intermediate basis set (IntS) that are common among the plurality of v layers, and use the received indicator $i_{1,6,l}$ to determine, from the intermediate basis set, $M_l$ bases included in the basis subset for each layer l of the plurality of v layers,
wherein the full basis set comprises $N_3$ bases, and
wherein $N_3$, N', and $M_l$ are positive integers; $M_l \leq N_3$ when the condition is satisfied and $M_l < N' < N_3$ when the condition is not satisfied; l∈{1, . . . , v}; and v≥1 is a rank value.

10. The BS of claim 9, wherein:
when a value of $N_3$ is less than or equal to nineteen ($N_3 \leq 19$), the condition is satisfied; and
when the value of $N_3$ is greater than nineteen ($N_3 > 19$), the condition is not satisfied.

11. The BS of claim 10, wherein one of the indices of the $M_l$ bases included in the basis subset is fixed to zero for each layer l of the plurality of v layers.

12. The BS of claim 11, wherein the indicator $i_{1,6,l}$ indicates the indices of the remaining $M_l$–1 bases included in the basis subset for each layer l of the plurality of v layers, wherein a payload of the indicator $i_{1,6,l}$ is $$\left\lceil \log_2 \binom{N_3 - 1}{M_l - 1} \right\rceil \text{ bits}$$

when the condition is satisfied and $$\left\lceil \log_2 \binom{N' - 1}{M_l - 1} \right\rceil \text{ bits}$$

when the condition is not satisfied, and $\lceil \ \rceil$ is a ceiling function.

13. The BS of claim 11, wherein when the condition is not satisfied, the indicator $i_{1,5}$ indicates an initial basis index ($M_{initial}$) of the intermediate basis set (IntS), which is determined as IntS={$(M_{initial}+i)$mod $N_3$,$i$=0,1, . . . ,$N'$–1}, where mod is a modulo function.

14. The BS of claim 9, wherein:
the transceiver is further configured to receive a channel state information (CSI) report from the UE; and
the CSI report includes a pre-coding matrix indicator (PMI), the PMI including the indicator $i_{1,6,l}$ for each layer l of the plurality of v layers, and based on the condition not being satisfied, the indicator $i_{1,5}$.

15. The BS of claim 9, wherein the full basis set comprises a set of discrete Fourier transform (DFT) vectors:

$$w_n = \left[ 1 \ e^{j\frac{2\pi n}{N_3}} \ e^{2j\frac{2\pi n}{N_3}} \ \ldots \ e^{(N_3-1)j\frac{2\pi n}{N_3}} \right],$$

where n=0, 1, . . . , $N_3$–1.

16. The BS of claim 9, wherein a value of N' is such that N'=2$M_l$.

17. A method for operating a user equipment (UE), the method comprising:
in response to a condition being satisfied, selecting, from a full basis set, a basis subset comprising $M_l$ bases for each layer l of a plurality of v layers;
in response to the condition not being satisfied, selecting, from the full basis set, an intermediate basis set (IntS) comprising N' bases that are common among the plurality of v layers, and selecting, from the selected intermediate basis set, the basis subset comprising $M_l$ bases for each layer l of the plurality of v layers;

transmitting, to a base station (BS), for each layer l of the plurality of v layers, an indicator $i_{1,6,l}$ indicating indices of the $M_l$ bases included in the selected basis subset; and based on the condition not being satisfied, transmitting, to the BS, an indicator $i_{1,5}$ indicating indices of the N' bases included in the selected intermediate basis set (IntS);

wherein the full basis set comprises $N_3$ bases, and wherein $N_3$, N', and $M_l$ are positive integers; $M_l < N_3$ when the condition is satisfied and $M_l < N' < N_3$ when the condition is not satisfied; $l \in \{1, \ldots, v\}$; and $v \geq 1$ is a rank value.

18. The method of claim 17, wherein:

when a value of $N_3$ is less than or equal to nineteen ($N_3 \leq 19$), the condition is satisfied; and when the value of $N_3$ is greater than nineteen ($N_3 > 19$), the condition is not satisfied.

19. The method of claim 18, wherein:

one of the indices of the $M_l$ bases included in the selected basis subset is fixed to zero for each layer l of the plurality of v layers;

the indicator $i_{1,6,l}$ indicates the indices of the remaining $M_l-1$ bases included in the selected basis subset for each layer l of the plurality of v layers, wherein a payload of the indicator $i_{1,6,l}$ is $$\left\lceil \log_2 \binom{N_3-1}{M_l-1} \right\rceil \text{ bits}$$

when the condition is satisfied and $$\left\lceil \log_2 \binom{N'-1}{M_l-1} \right\rceil \text{ bits}$$

when the condition is not satisfied, and $\lceil \cdot \rceil$ is a ceiling function; and when the condition is not satisfied, the indicator $i_{1,5}$ indicates an initial basis index ($M_{initial}$) of the intermediate basis set (IntS), which is determined as $\text{IntS} = \{(M_{initial}+i) \bmod N_3, i=0,1,\ldots,N'-1\}$, where mod is a modulo function.

20. The method of claim 17, wherein:

the full basis set is a set of discrete Fourier transform (DFT) vectors:

$$w_n = \left[1 \quad e^{j\frac{2\pi n}{N_3}} \quad e^{2j\frac{2\pi n}{N_3}} \quad \ldots \quad e^{(N_3-1)j\frac{2\pi n}{N_3}}\right],$$

where n=0, 1, ..., $N_3-1$; and a value of N' is such that $N'=2M_l$.

* * * * *